US010742458B2

(12) United States Patent
Fujii et al.

(10) Patent No.: US 10,742,458 B2
(45) Date of Patent: Aug. 11, 2020

(54) EQUALIZER CIRCUIT AND CONTROL METHOD OF EQUALIZER CIRCUIT

(71) Applicant: Toshiba Memory Corporation, Minato-ku, Tokyo (JP)

(72) Inventors: Shinsuke Fujii, Tokyo (JP); Naoki Kitazawa, Yokohama Kanagawa (JP); Takaya Yamamoto, Kawasaki Kanagawa (JP); Tomohiko Ito, Kawasaki Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 0 days.

(21) Appl. No.: 16/059,183

(22) Filed: Aug. 9, 2018

(65) Prior Publication Data

US 2019/0052488 A1    Feb. 14, 2019

Related U.S. Application Data

(63) Continuation-in-part of application No. 15/908,413, filed on Feb. 28, 2018, now abandoned.

(30) Foreign Application Priority Data

Aug. 9, 2017 (JP) ................................ 2017-154189
Jun. 15, 2018 (JP) ................................ 2018-114755

(51) Int. Cl.
*H04L 25/03* (2006.01)

(52) U.S. Cl.
CPC .. *H04L 25/03878* (2013.01); *H04L 25/03057* (2013.01); *H04L 25/03076* (2013.01);
(Continued)

(58) Field of Classification Search
CPC ......... H04L 25/03878; H04L 25/03343; H04L 25/03076; H04L 25/03159;
(Continued)

(56) References Cited

U.S. PATENT DOCUMENTS 8,548,108 B2 * 10/2013 Hidaka ............. H04L 25/03076
375/316
9,191,244 B2 * 11/2015 Tan ................... H04L 25/03057
(Continued)

FOREIGN PATENT DOCUMENTS

JP    S61-045414 A    3/1986
JP    H06-077771 A    3/1994
(Continued)

*Primary Examiner* — Kenneth T Lam
(74) *Attorney, Agent, or Firm* — White & Case LLP

(57) ABSTRACT

According to an embodiment, a control circuit of an equalizer configured to set a first amount to a linear equalizer, determine a second amount optimizing a non-linear equalizer with respect to a first signal generated by the linear equalizer to which the first amount is set, set the second amount to the non-linear equalizer, update an amount from the first amount to a third amount smaller than the first amount based on a magnitude of the first amount, set the third amount to the linear equalizer, determine a fourth amount optimizing the non-linear equalizer with respect to a second signal generated by the linear equalizer to which the third amount is set, and update an amount from the second amount to the fourth amount.

16 Claims, 23 Drawing Sheets

(52) U.S. Cl.
CPC .. *H04L 25/03159* (2013.01); *H04L 25/03343* (2013.01); *H04L 25/03885* (2013.01); *H04L 2025/03808* (2013.01)

(58) Field of Classification Search
CPC ..... H04L 2025/03808; H04L 25/03885; H04L 25/03057
See application file for complete search history.

(56) References Cited

U.S. PATENT DOCUMENTS

| | | | |
|---|---|---|---|
| 9,401,800 B1* | 7/2016 | Kang | H04L 7/0062 |
| 9,438,450 B1* | 9/2016 | Kang | H04L 25/03885 |
| 9,444,656 B2 | 9/2016 | Ding et al. | |
| 9,450,788 B1* | 9/2016 | Cops | H04L 25/03057 |
| 9,749,162 B1* | 8/2017 | Mobin | H04L 25/03885 |
| 2013/0114663 A1* | 5/2013 | Ding | H04L 25/03038 375/230 |
| 2013/0148712 A1* | 6/2013 | Malipatil | H04L 25/0307 375/233 |
| 2016/0173299 A1* | 6/2016 | Islam | H04L 25/03057 375/233 |

FOREIGN PATENT DOCUMENTS

| | | |
|---|---|---|
| JP | 2014-143672 A | 8/2014 |
| JP | 5834984 A | 11/2015 |
| JP | 2016-127489 A | 7/2016 |
| JP | 6170663 A | 7/2017 |

* cited by examiner

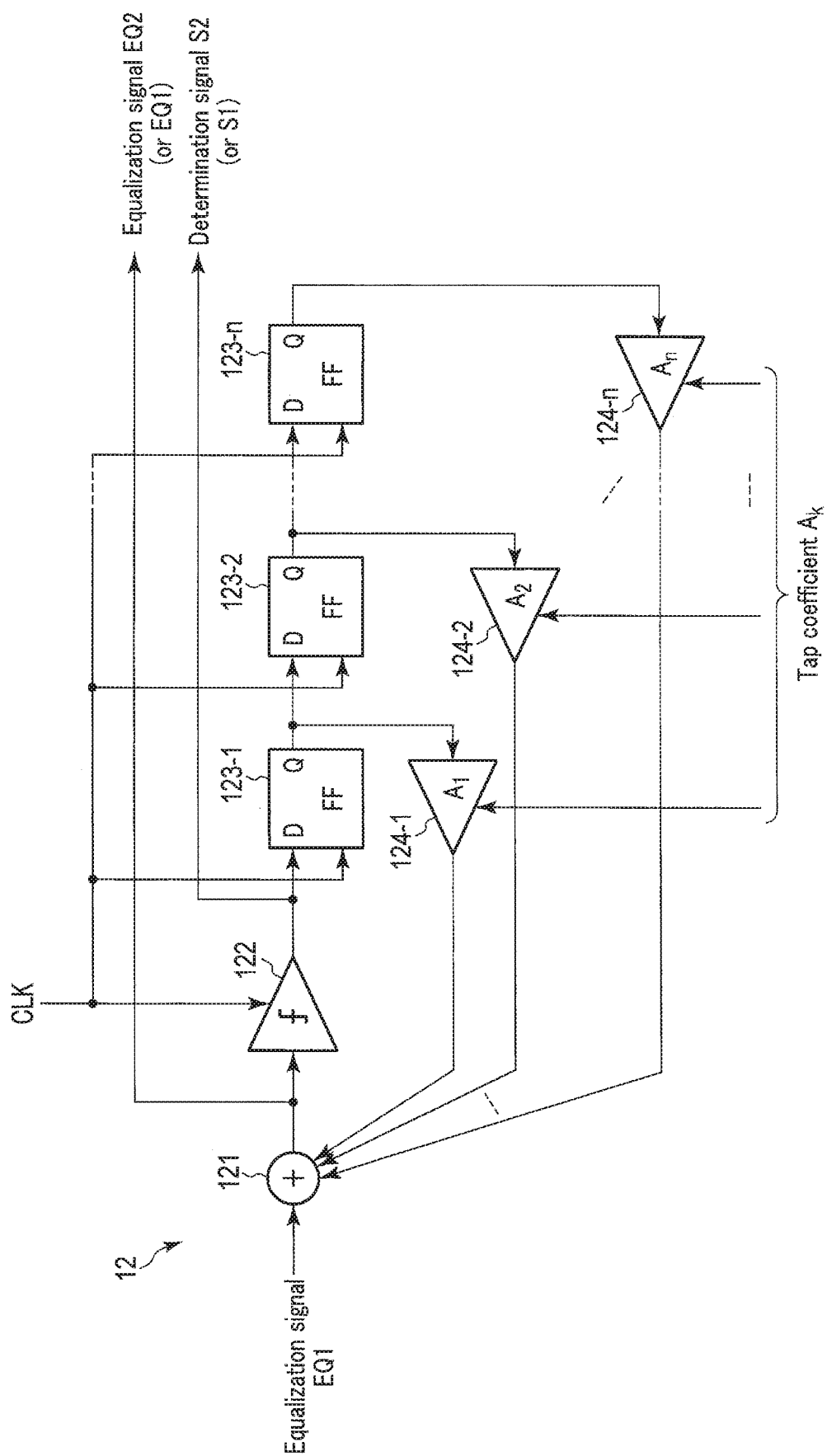
F I G. 5

| Boost amount Bopt1[dB] | Total reduction amount M[dB] |
|---|---|
| 41~50 | 20 |
| 31~40 | 15 |
| 21~30 | 10 |
| 11~20 | 5 |
| 1~10 | 0 |

F I G. 7

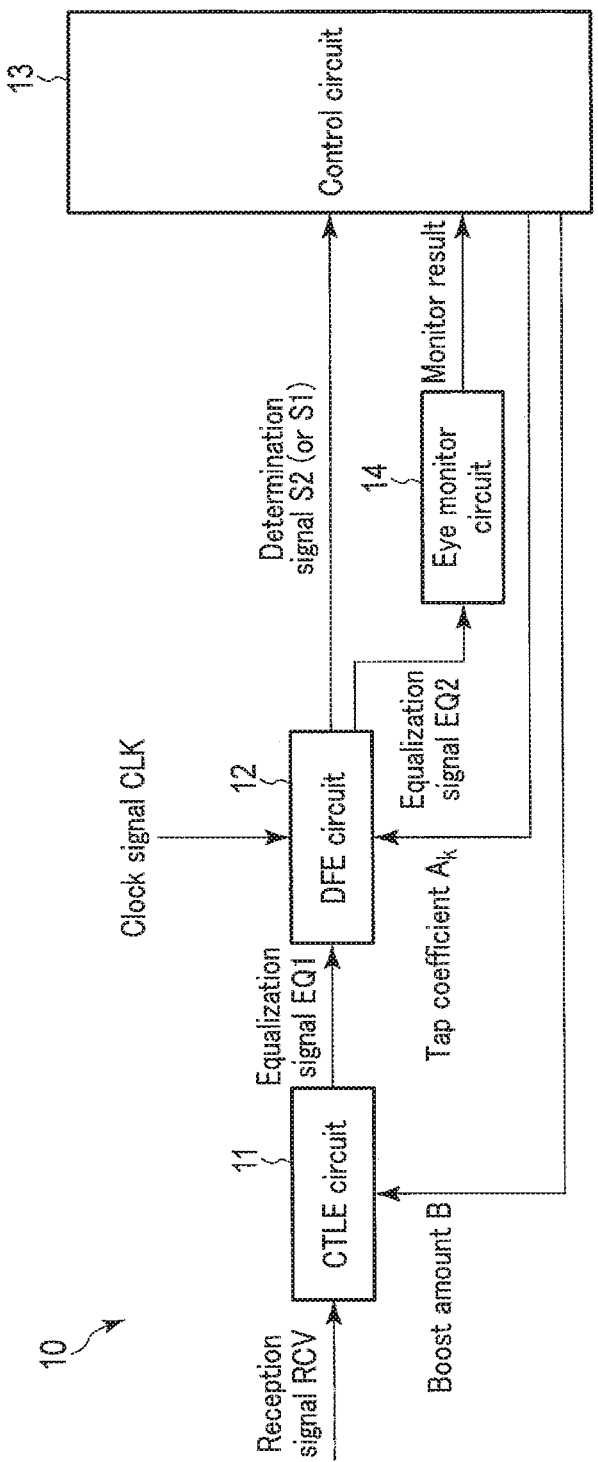
F I G. 9

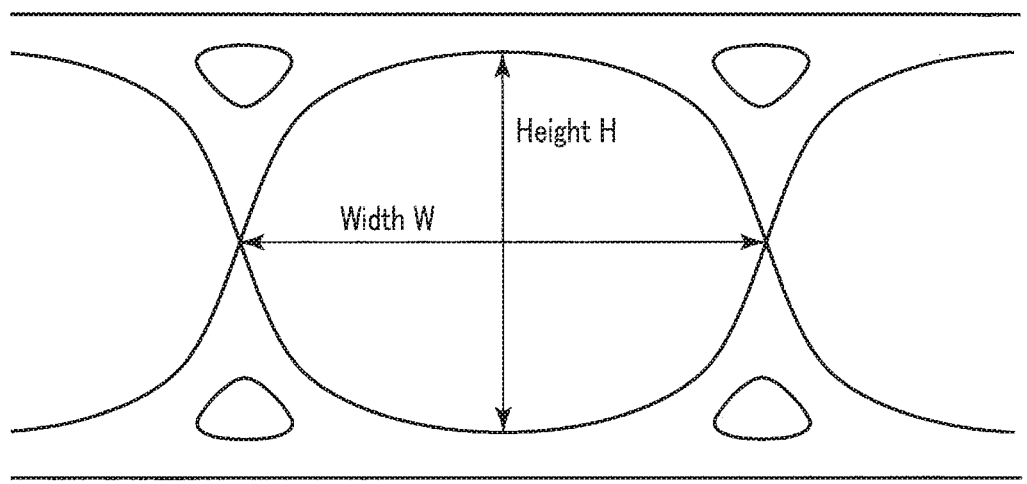
F I G. 10

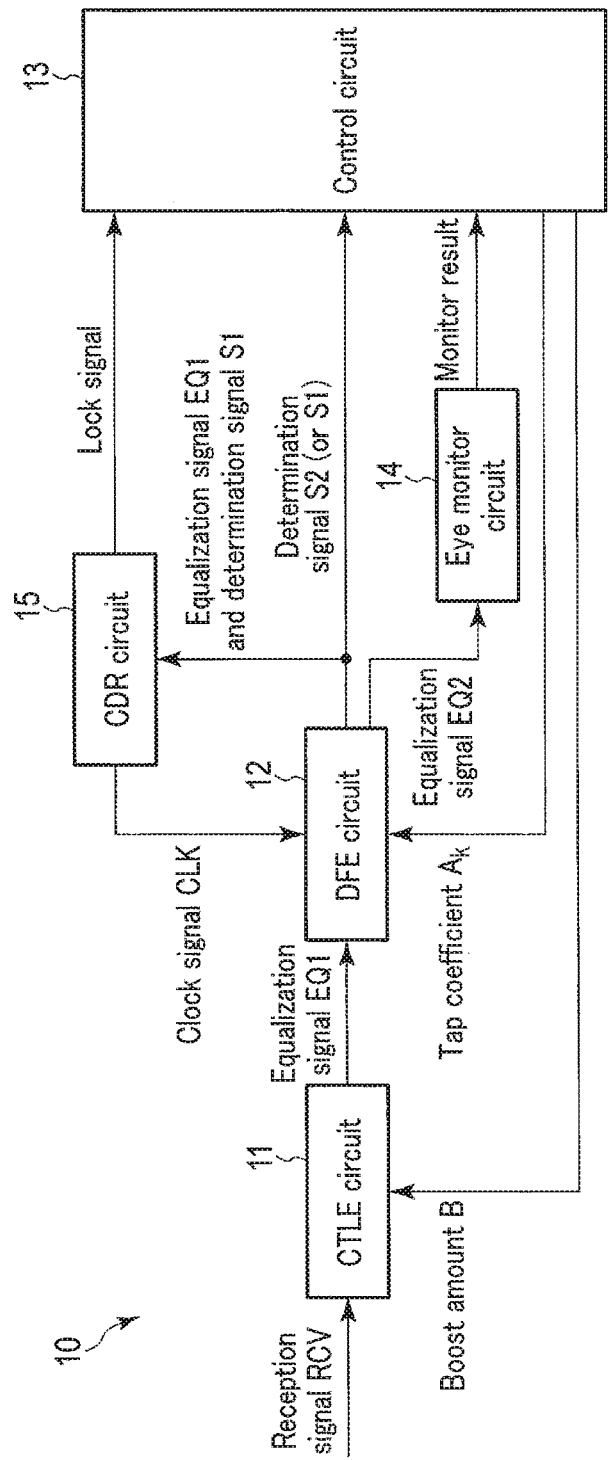
F I G. 13

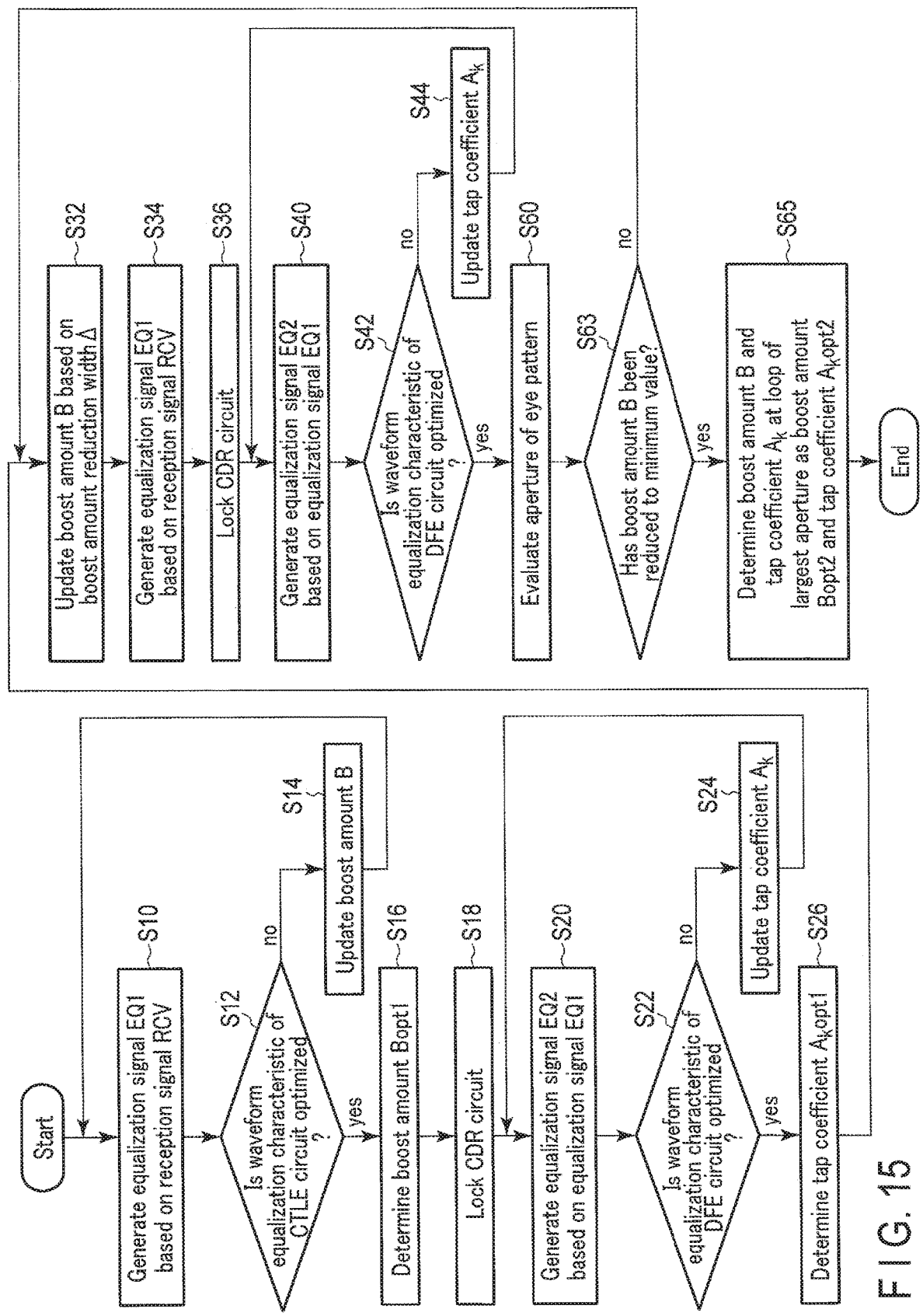
F I G. 15

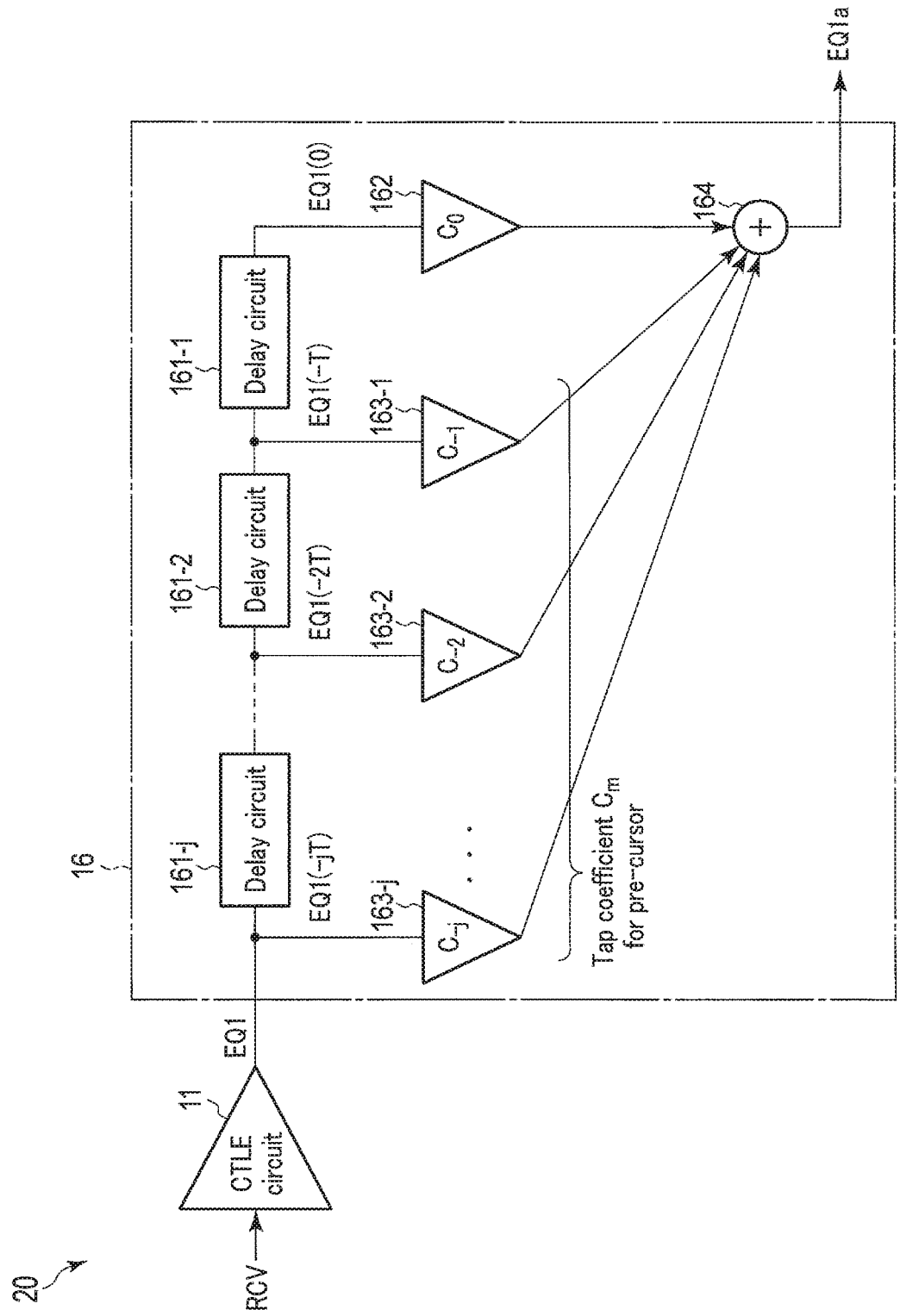
F I G. 18

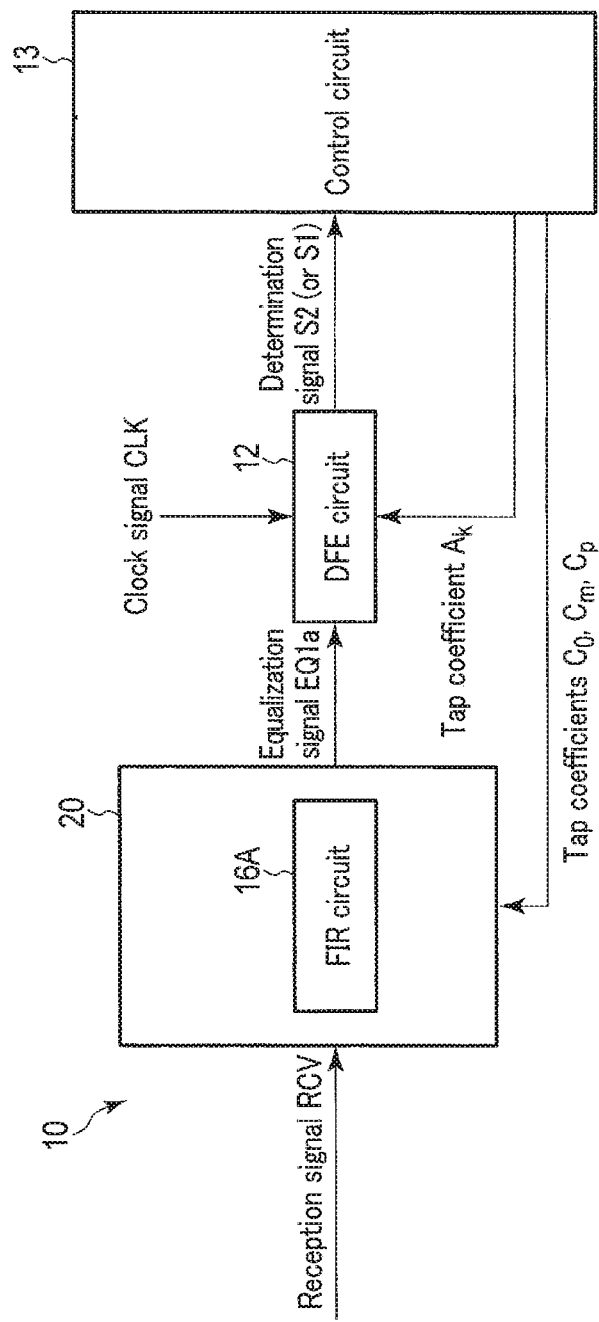
F I G. 21

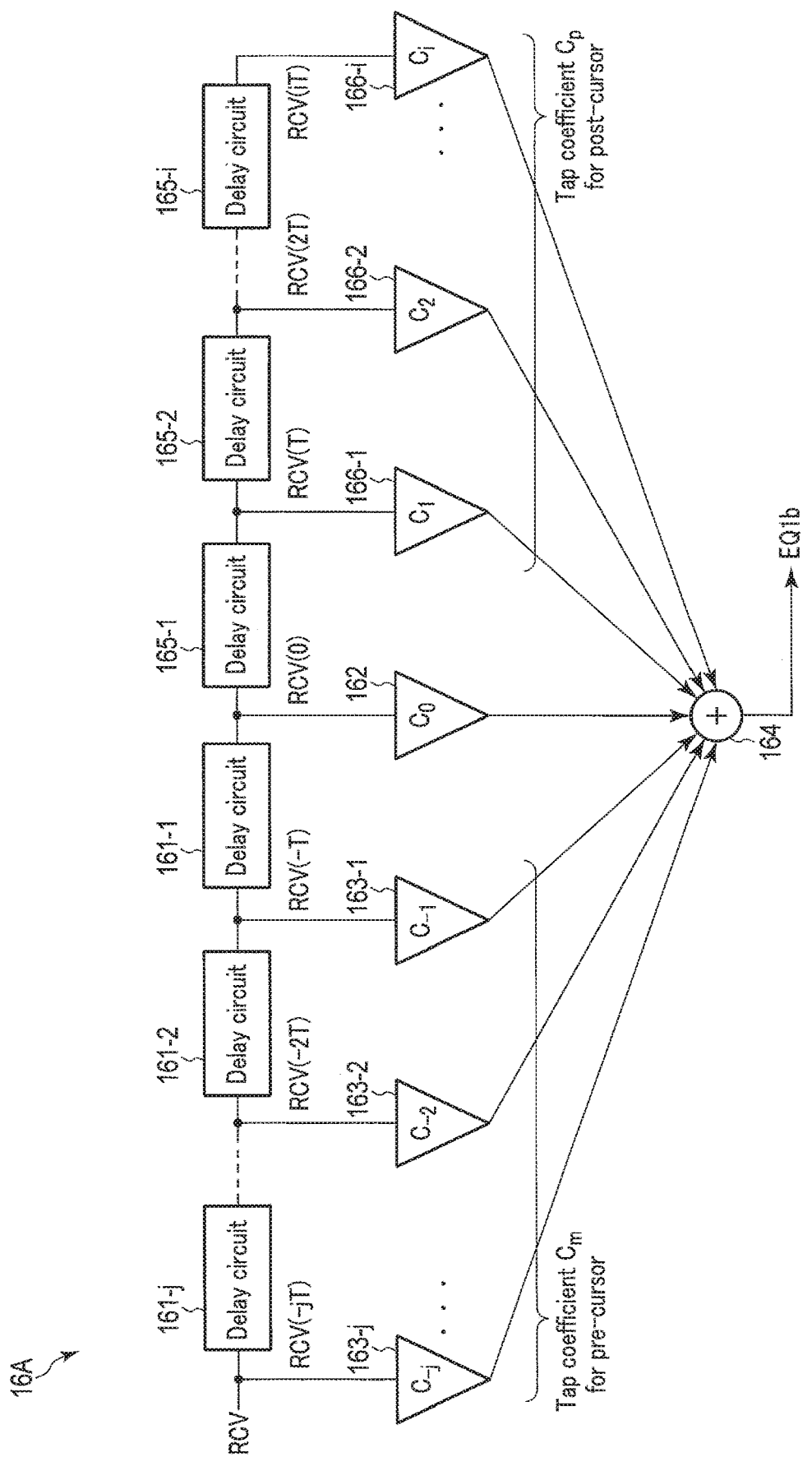
F I G. 22

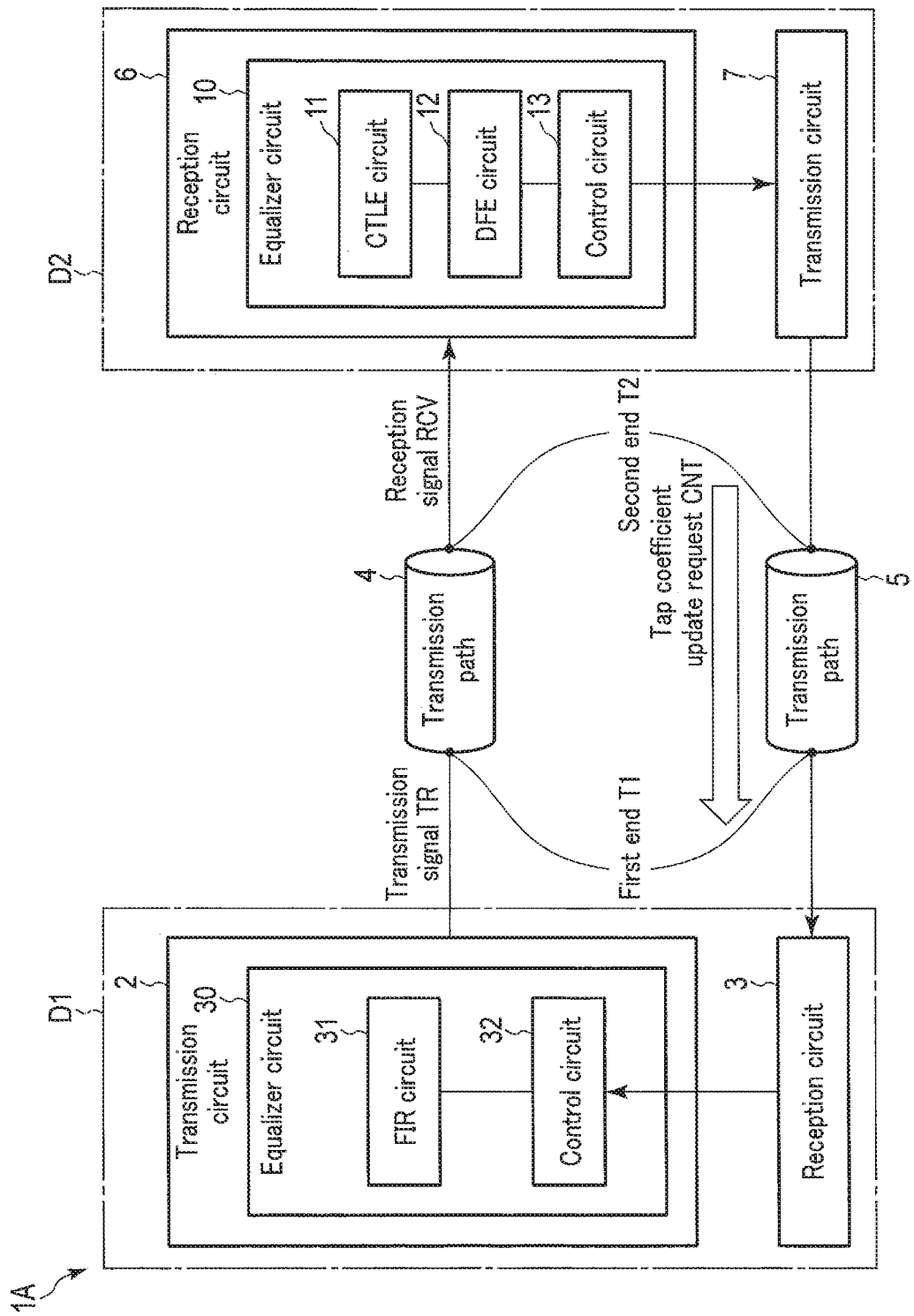
F I G. 24

EQUALIZER CIRCUIT AND CONTROL METHOD OF EQUALIZER CIRCUIT

CROSS-REFERENCE TO RELATED APPLICATIONS

This application is a Continuation-in-Part Application of U.S. patent application Ser. No. 15/908,413, filed Feb. 28, 2018 and based upon and claims the benefit of priority from Japanese Patent Application No. 2017-154189, filed Aug. 9, 2017; and No. 2018-114755, filed Jun. 15, 2018 the entire contents of all of which are incorporated herein by reference.

FIELD

Embodiments described herein relate generally to an equalizer circuit and a control method of the equalizer circuit.

BACKGROUND

An equalizer circuit for compensating for a loss caused by a transmission characteristic of a transmission path is known.

BRIEF DESCRIPTION OF THE DRAWINGS

FIG. 5 is a block diagram for explaining a configuration of a DFE circuit of the equalizer circuit according to the first embodiment.

FIG. 7 is a table, for explaining a total reduction amount of a boost amount in the equalizer circuit according to the first embodiment.

FIG. 9 is a block diagram for explaining a configuration of an equalizer circuit according to a second embodiment.

FIG. 10 is a schematic diagram showing an eye pattern monitored at an eye monitor circuit according to the second embodiment.

FIG. 13 is a block diagram for explaining a configuration of an equalizer circuit according to a third embodiment.

FIG. 15 is a flowchart for explaining a waveform equalization operation of an equalizer circuit according to a modified example of the third embodiment.

FIG. 18 is a block diagram for explaining a configuration of a linear equalizer of the equalizer circuit according to the fourth embodiment.

FIG. 21 is a block diagram for explaining a configuration of an equalizer circuit according to a modified example of the fourth embodiment.

FIG. 22 is a block diagram for explaining configuration of a linear equalizer of the equalizer circuit according to the modified example of the fourth embodiment.

FIG. 24 is a block diagram for explaining a configuration of a transmission system according to a fifth embodiment.

DETAILED DESCRIPTION

In general, according to one embodiment, a linear equalizer configured to linearly amplify a certain band within a reception signal; a non-linear equalizer configured to determine a value of an output signal of the linear equalizer based on a clock signal, and to feed back a determination result of the value to the output signal; and a control circuit, wherein the control circuit is configured to set a first control amount to the linear equalizer, determine a second control amount that optimizes an equalization characteristic of the non-linear equalizer with respect to a first signal generated by the linear equalizer to which the first control amount is set, set the second control amount to the non-linear equalizer, update a control amount to be set to the linear equalizer from the first control amount to a third control amount that is smaller than the first control amount based on a magnitude of the first control amount, set the updated third control amount to the linear equalizer, determine a fourth control amount that optimizes the equalization characteristic of the non-linear equalizer with respect to a second signal generated by the linear equalizer to which the third control amount is set, and update a control amount to be set to the non-linear equalizer from the second control amount to the fourth control amount.

Hereinafter, embodiments will be explained with reference to the accompanying drawings. In the explanations below, structural elements having similar functions and configurations will be denoted by the same reference symbols.

1. First Embodiment

An equalizer circuit according to a first embodiment will be explained.

1.1 Configuration

First of all, a configuration of a transmission system including the equalizer circuit according to the first embodiment will be explained.

1.1.1 Configuration of Transmission System

Figure 1:
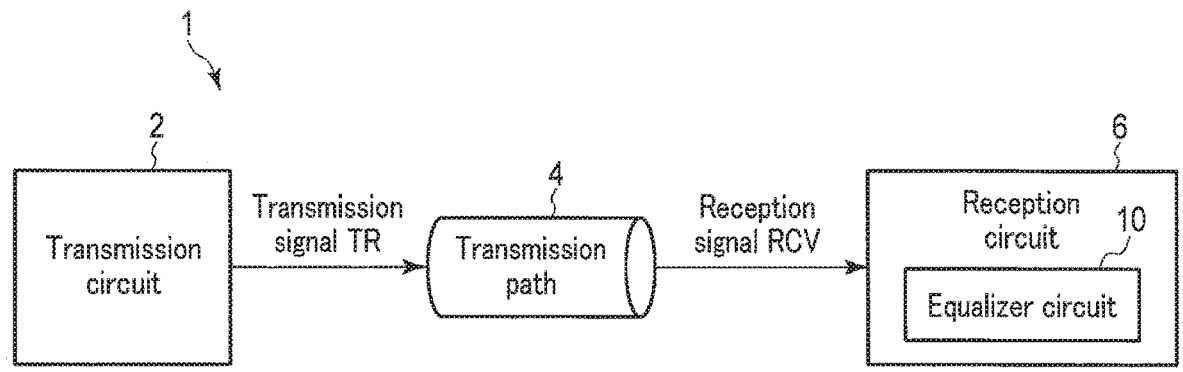
FIG. 1 is a block diagram for explaining a configuration of a transmission system according to a first embodiment.

FIG. 1 is a block diagram showing an example of a configuration of the transmission system according to the first embodiment. A transmission system 1, for example, includes a plurality of circuits provided on a print substrate, and transmits various data from one circuit to another circuit using high-speed serial communication.

As shown in FIG. 1, the transmission system 1 includes a transmission circuit 2, a transmission path 4, and a reception circuit 6. The transmission circuit 2 and the reception circuit 6 realize the high-speed serial communication via the transmission path 4.

The transmission circuit 2 has a functional configuration for transmitting a transmission signal TR to the reception circuit 6. The transmission signal TR is, for example, a pulse signal with a digital value capable of identifying "0" and "1" at each continuous time (section). The transmission circuit 2 transmits information encoded as the pulse signal to the reception circuit 6.

The transmission path 4 is a physical or spatial transmission medium for transmitting the transmission signal TR to the reception circuit 6, which, for example, is a wiring that connects the transmission circuit 2 and the reception circuit 6. Depending on a physical structure or a material of the transmission medium, the transmission path 4 may have various transmission characteristics. The transmission characteristics, for example, include a frequency characteristic accompanying a loss of gain in a specific frequency band. The transmission signal TR is converted into a reception signal RCV while receiving a loss in accordance with the transmission characteristic of the transmission path 4, and is input to the reception circuit 6.

The reception circuit 6 receives the reception signal RCV and decodes information included in the transmission signal TR based on the reception signal RCV. However, in some cases where the transmission path 4 causes a shape of a waveform of the reception signal RCV to become significantly different from that of a waveform of the transmission signal TR, the reception circuit 6 may not be able to decode the information correctly. The reception circuit 6 includes an equalizer circuit (hereinafter, referred to as an equalizer) 10 to correctly decode the information included in the transmission signal TR even in such case.

The equalizer 10 is a circuit with a functional configuration that compensates for a loss that has occurred in a certain frequency band by the transmission characteristic of the transmission path 4.

Figure 2:
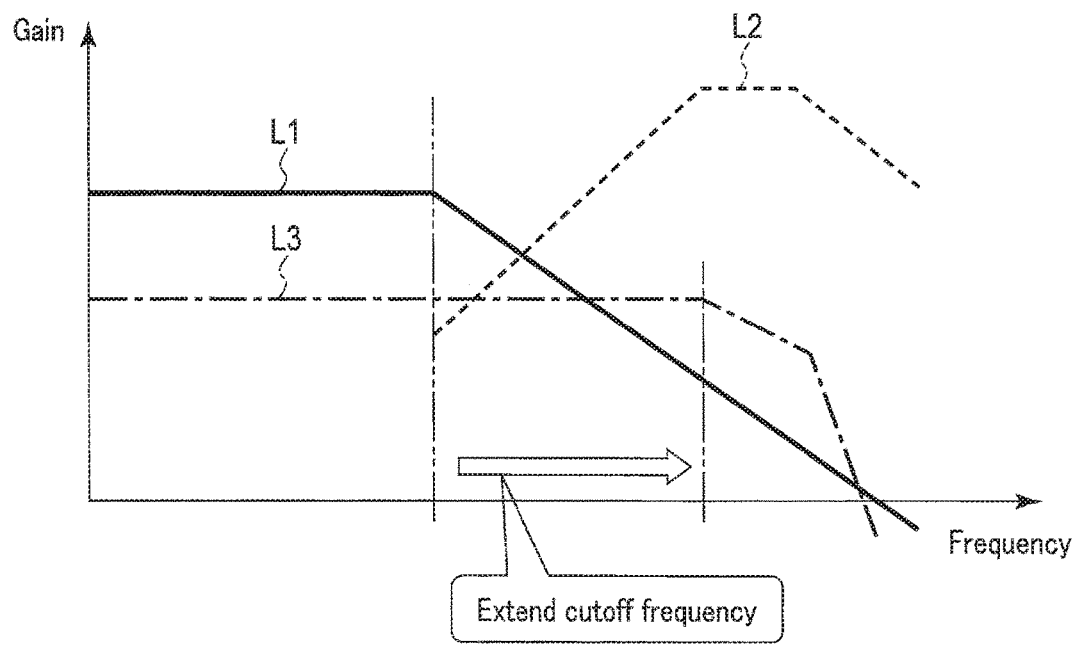
FIG. 2 is a diagram for explaining a relationship between a transmission characteristic of a transmission path and a waveform equalization characteristic of an equalizer circuit according to the first embodiment.

FIG. 2 is a diagram for explaining a relationship between the loss caused by the transmission path 10 and a compensation performed by the equalizer 10 in the transmission system 1 according to the first embodiment in FIG. 2, a transmission characteristic of the transmission path 4, a compensation characteristic of the equalizer 10 (hereinafter, referred to as a waveform equalization characteristic), and a combined characteristic of the transmission characteristic of the transmission path 4 and the waveform equalization characteristic of the equalizer 10 are expressed by characteristics L1, L2, and L3, respectively.

As shown in FIG. 2, the transmission characteristic L1 of the transmission path 4 has, for example, a characteristic as a low-pass filter for removing a high-frequency component. Therefore, via the transmission path 4, the transmission signal TR may be converted into the reception signal RCV from which the high-frequency component has been removed. Therefore, even in a case where a pulse signal with a sharp-pointed edge is transmitted as the transmission signal TR, the reception signal RCV may have a waveform with a blunt edge. Accordingly, an Inter Symbol Interference (ISI) in which the waveforms overlap between neighboring sections that originally have individual data would easily occur to the reception signal RCV.

In contrast, the waveform equalization characteristic L2 of the equalizer 10 is set so that the gain of the high-frequency band becomes high. Therefore, in the combined characteristic L3, a cutoff frequency extends with respect to the transmission characteristic L1. In other words, compared to the reception signal RCV for which a loss is not compensated by the equalizer 10, a signal for which the loss is compensated by the equalizer 10 may be equalized to a waveform that has a shape capable of decoding information included in the transmission signal TR.

1.1.2 Configuration of Equalizer

A configuration example of the equalizer according to the first embodiment will be explained.

Figure 3:
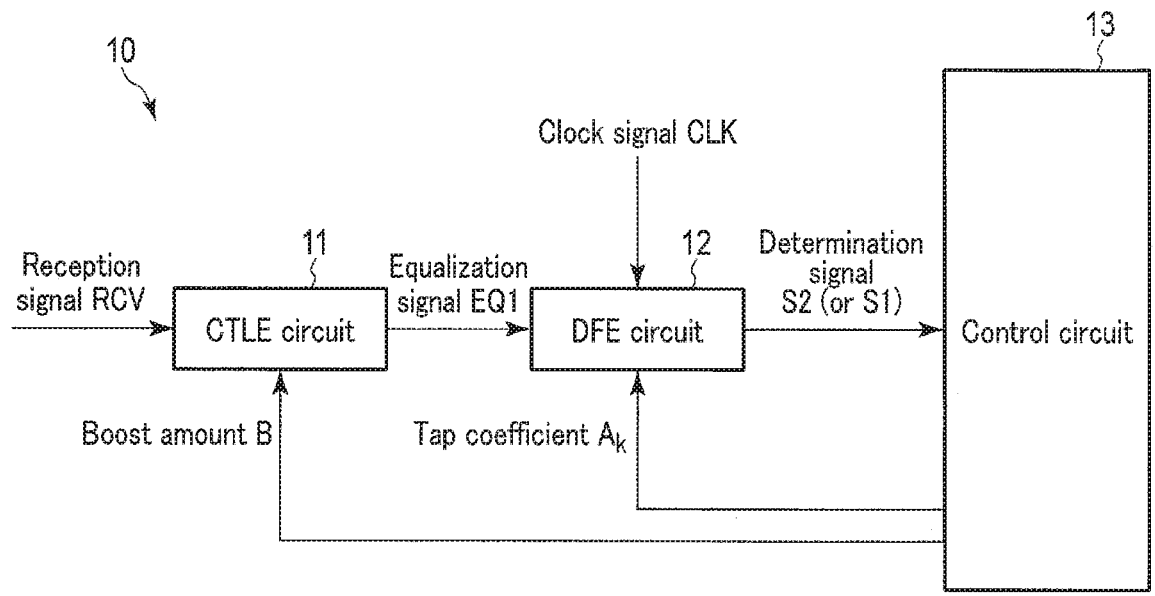
FIG. 3 is a block diagram for explaining a configuration of the equalizer circuit according to the first embodiment.

FIG. 3 is a block diagram for explaining the configuration example of the equalizer according to the first embodiment. As shown in FIG. 3, the equalizer 10 includes a CTLE circuit 11, a DFE circuit 12, and a control circuit 13.

The CTLE circuit 11 includes, for example, a continuous time linear equalizer. The CTLE circuit 11 has a functional configuration that, when receiving the reception signal RCV, performs linear equalization processing to amplify (boost) the gain of a high frequency band of the reception signal RCV. When the CTLE circuit 11 receives a boost amount B from the control circuit 13, the high frequency band of the reception signal RCV is boosted in accordance with the boost amount B to generate an equalization signal EQ1. The CTLE circuit 11 transmits the equalization signal EQ1 to the DFE circuit 12.

The DFE (Decision Feedback Equalizer) circuit 12, for example, includes a decision feedback equalizer. Based on a clock signal CLK, the DFE circuit 12 determines whether a digital value of the input signal is "0" or "1" in sections from the present to past, and generates a determination signal based on the determination result. The DFE circuit 12 has a functional configuration that, when receiving a tap coefficient $A_k$ from the control circuit 13, performs non-linear equalization processing that feeds back the determination signal to the input signal based on the tap coefficient $A_k$. The clock signal CLK is, for example, determined in advance by a predetermined method. In the input signal, the tap coefficient $A_k$ corresponds to a digital value of a portion corresponding to a kth section in the past from a reference time. K is an integer between 1 through n (n is an optional natural number).

Specifically, when the DFE circuit 12 receives the tap coefficient $A_k$ from the control circuit 13, it combines a feedback signal that is generated by multiplying the determination signal by the tap coefficient $A_k$ with the equalization signal EQ1 to generate an equalization signal EQ2. The DFE circuit 12 transmits the determination result with respect to the equalization signal EQ2 to the control circuit 13 as a determination signal S2. The DFE circuit 12 may also transmit the determination result with respect to the equalization signal EQ1 to the control circuit 13 as a determination signal S1.

The control circuit 13 receives the determination signals S1 and S2, and controls the entire equalizer 10. Specifically, the control circuit 13 determines the boost amount B to be applied to the CTLE circuit 11 and the tap coefficient $A_k$ to be applied to the DFE circuit 12, and transmits them respectively to the CTLE circuit 11 and the DFE circuit 12.

The control circuit 13 has a functional configuration for determining the boost amount B that optimally equalizes the equalization signal EQ1 based on the reception signal RCV input to the CTLE circuit 11. The control circuit 13 also has a functional configuration for determining the tap coefficient $A_k$ that optimally equalizes the equalization signal EQ2 based on the equalization signal EQ1 input to the DFE circuit 12.

1.1.3 Functional Configuration of CTLE Circuit

The functional configuration of the CTLE circuit will be explained below.

Figure 4:
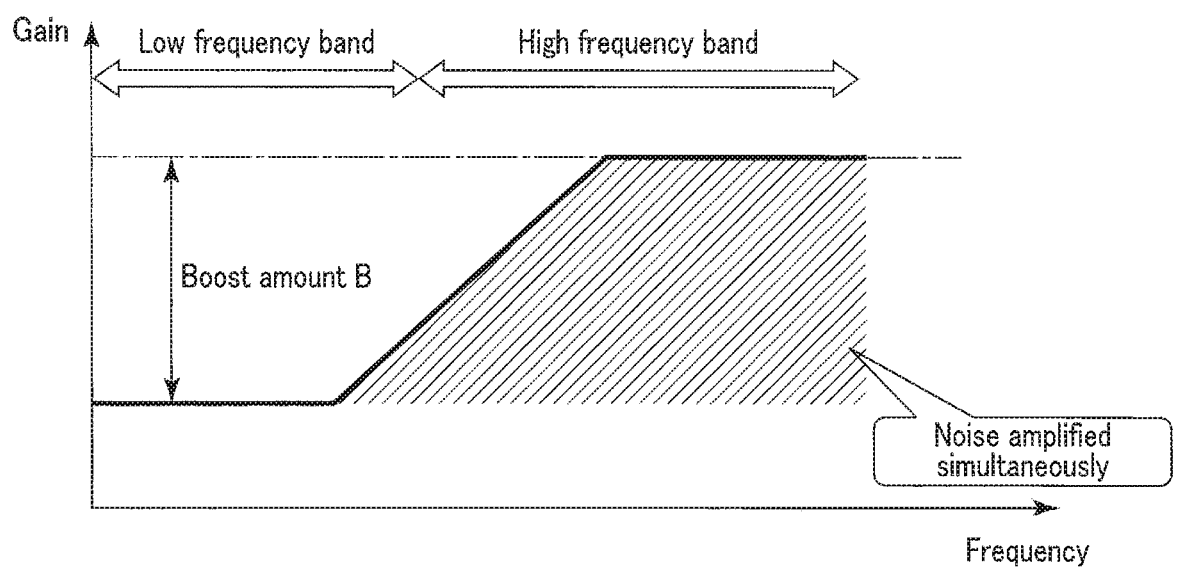
FIG. 4 is a diagram for explaining a functional configuration of a CTLE circuit of the equalizer circuit according to the first embodiment.

FIG. 4 is a diagram for explaining an equalization characteristic of the CTLE circuit of the equalizer according to the first embodiment.

As shown in FIG. 4, the CTLE circuit 11 generates the equalization signal EQ1 by amplifying the gain of the high frequency band of the reception signal RCV more than a low frequency band. The boost amount B is defined as, for example, a difference between the gain of the low frequency band and the gain of the high frequency band in the equalization characteristic of the CTLE circuit 11. The CTLE circuit 11 is configured to adaptively adjust the equalization characteristic in accordance with the boost amount B instructed by the control circuit 13. In this manner, the CTLE circuit 11 is capable of setting an optimal equalization characteristic in accordance with the reception signal RCV (i.e., the transmission characteristic of the transmission path 4).

The CTLE circuit 11 directly amplifies the high frequency band of the reception signal RCV. Therefore, a noise component that is included in the amplified high frequency band is simultaneously amplified. Accordingly, the smaller the boost amount B set for the CTLE circuit 11 is, the smaller an influence from a noise included in the equalization signal EQ1 can be.

1.1.4 Functional Configuration of DFE Circuit

The functional configuration of the DFE circuit 12 will be explained below.

FIG. 5 is a block diagram for explaining the configuration of the DFE circuit of the equalizer according to the first embodiment. As shown in FIG. 5, the DFE circuit 12 includes an adder 121, a determination circuit 122, a plurality of flip-flop circuits 123 (123-1, 123-2, ..., 123-$n$), and a plurality of buffer circuits 124 (124-1, 124-2, ..., 124-$n$).

The adder 121 adds feedback signals from each of the buffer circuits 124 to the equalization signal EQ1, and transmits the obtained signal to the determination circuit 122. In a case where the DFE circuit 12 outputs the determination signal S1, the adder 121 transmits the equalization signal EQ1 to the determination circuit 122.

When receiving the signal from the adder 121, the determination circuit 122 determines whether the data included in the signal is "0" or "1" in a plurality of sections from the present to the past, and generates a determination signal in accordance with the determination result. In other words, the determination signal is a pulse signal with an amplitude level corresponding to a digital value determined in each section. The section in which the signal is determined is determined based on the clock signal CLK separately input to the determination circuit 122. The determination circuit 122 transmits the generated determination signal to a plurality of flip-flop circuits 123.

Based on the clock signal CLK, each of the flip-flop circuits 123 holds a digital value of a corresponding section within the determination signal. Specifically, for example, each of the flip-flop circuits 123-1, 123-2, ..., and 123-$n$ holds a digital value of a time in a first section, a second section, ..., and nth section in the past from the reference time, respectively. Each of the flip-flop circuits 123-1, 123-2, ..., and 123-$n$ outputs the held digital values to the buffer circuits 124-1, 124-2, ..., and 124-$n$, respectively, to be held therein.

Corresponding tap coefficients $A_1$, $A_2$, ..., and $A_n$ are transmitted to each of the buffer circuits 124-1, 124-2, ..., and 124-$n$, respectively, from the control circuit 13, and are set therein. Each of the buffer circuits 124-1, 124-2, ..., and 124-$n$ generates a signal that is obtained by multiplying the digital values held by the corresponding flip-flop circuits 123-1, 123-2, ..., and 123-$n$ by the corresponding tap coefficients $A_1$, $A_2$, ..., $A_n$, and by inverting the result thereof, as the feedback signal, and transmits it to the adder 121.

In this manner, by combining the feedback signal with the equalization signal EQ1, the equalization signal EQ2 from which the ISI has been reduced can be generated. By performing a determination operation with respect to the equalization signal EQ2, the determination circuit 122 is capable of generating the determination signal S2 in which the ISI is compensated. In a state where the flip-flop circuit 123 and the buffer circuit 124 are not operated, the DFE circuit 12 is capable of outputting the equalization signal EQ1 and the determination signal S1.

Since the feedback signal is generated based on the determination signal S1, the noise is not amplified. Therefore, an influence of noise can be reduced more in the DFE circuit 12 than in the CTLE circuit 11.

The DFE circuit 12 is configured to adaptively adjust the equalization characteristic in accordance with the tap coefficients $A_k$ instructed by the control circuit 13. In this manner, the DFE circuit 12 can be set to an optimal equalization characteristic in accordance with the equalization signal EQ1 (i.e., the transmission characteristic of the transmission path 4 and the equalization characteristic of the CTLE circuit 11).

1.2 Operation of Equalizer

Figure 6:
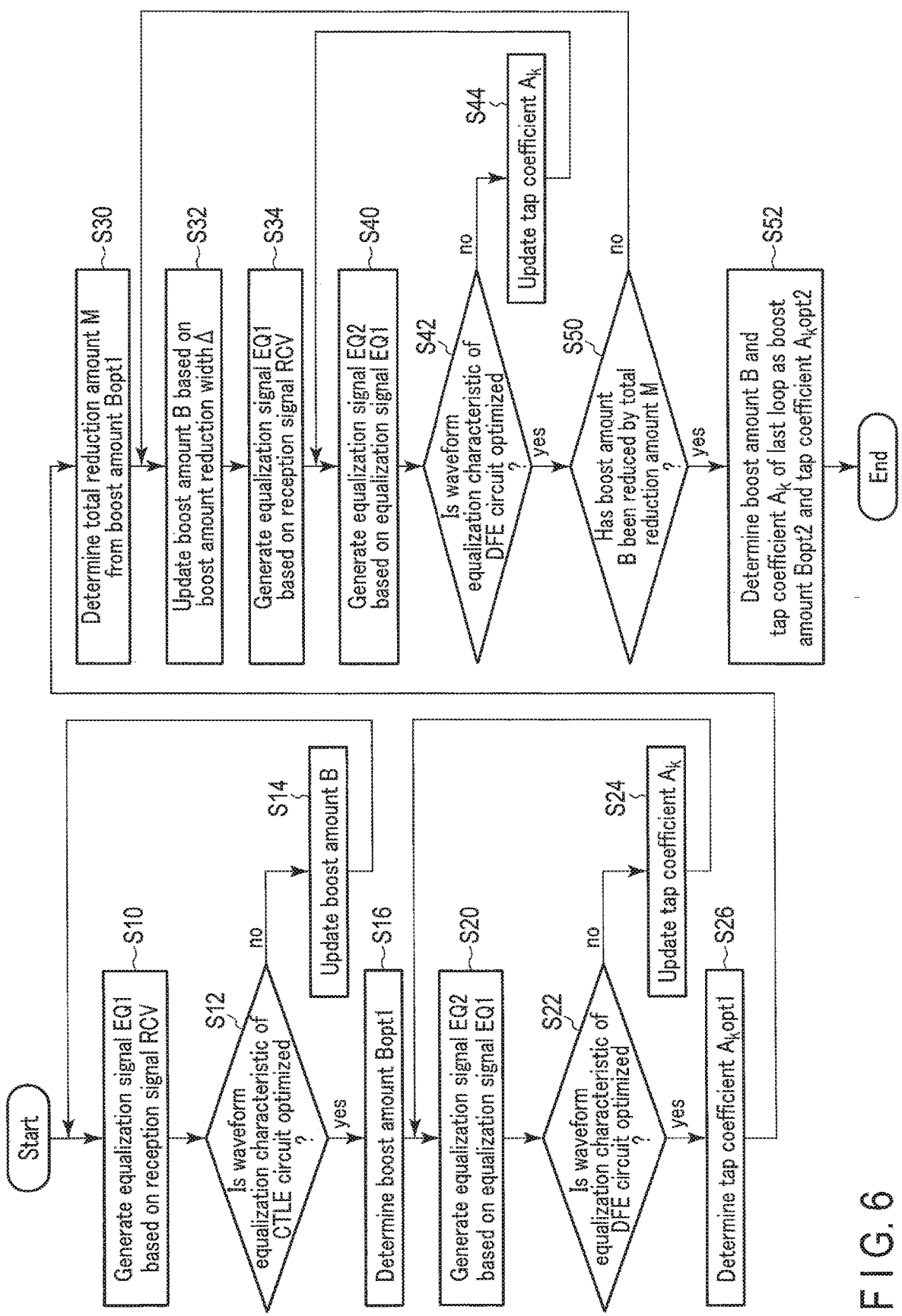
FIG. 6 is a flowchart for explaining a waveform equalization operation of the equalizer circuit according to the first embodiment.

An operation of the equalizer according to the first embodiment will be explained. FIG. 6 is a flowchart for explaining a waveform equalization operation of the equalizer according to the first embodiment. FIG. 6 shows a method for determining the boost amount B and the tap coefficient $A_k$ for obtaining a waveform equalization characteristic capable of optimally compensating for the transmission characteristic of the transmission path 4 before using the transmission system 1 as a regular operation in a state where the transmission characteristic of the transmission path 4 is unknown.

When determining the boost amount B and the tap coefficient $A_k$, the transmission system 1 may transmit a known test signal between the transmission circuit 2 and the reception circuit 6. Hereinafter, the control circuit 13 will be explained by assuming that the test signal to be restored is known.

As shown in FIG. 6, the transmission circuit 2 transmits the test signal as the transmission signal TR. The transmission signal TR becomes the reception signal RCV based on a loss characteristic of the transmission path 4. The reception circuit 6 receives the test signal as the reception signal RCV.

In S10, S12, S14, and S16, the CTLE circuit 11 and the control circuit 13 optimize the waveform equalization characteristic of the CTLE circuit 11 with respect to the reception signal RCV.

Specifically, in S10, when receiving the reception signal RCV, the CTLE circuit 11 generates the equalization signal EQ1 based on the reception signal RCV. The CTLE circuit 11 transmits the generated equalization signal EQ1 to the determination circuit 122 of the DFE circuit 12, and generates the determination signal S1. The generated determination signal S1 is transmitted to the control circuit 13.

In S12, based on the determination signal S1, the control circuit 13 determines whether or not the waveform equalization characteristic of the CTLE circuit 11 has been optimized. Specifically, for example, the control circuit 13 compares the determination signal S1 with the test signal, and determines that the waveform equalization characteristic has been optimized by the boost amount B that generates a most suitable determination signal S1 for the test signal.

In a case where the waveform equalization characteristic of the CTLE circuit 11 is determined as not being optimized (S12; no), the processing proceeds to S14. In S14, the control circuit 13 updates the boost amount and transmits it to the CTLE circuit 11, then, returns to S10.

In a case where the waveform equalization characteristic of the CTLE circuit 11 is determined as being optimized (S12; yes), loop processing is ended, and the processing proceeds to S16. In S16, the control circuit 13 determines the boost amount B in the last loop as a boost amount Bopt1, and proceeds to S20.

In S20, S22, S24, and S26, the DFE circuit 12 and the control circuit 13 optimize the waveform equalization characteristic of the DFE circuit 12 with respect to the equalization signal EQ1 generated by using the boost amount Bopt1.

Specifically, in S20, when receiving the equalization signal EQ1, the DFE circuit 12 generates the equalization signal EQ2 based on the equalization signal EQ1. The determination circuit 122 of the DFE circuit 12 generates the determination signal S2 based on the generated equalization signal EQ2. The generated determination signal S2 is transmitted to the control circuit 13.

In S22, based on the determination signal S2, the control circuit 13 determines whether or not the waveform equalization characteristic of the DFE circuit 12 has been optimized. Specifically, for example, the control circuit 13 compares the determination signal S2 with the test signal, and determines that the waveform equalization characteristic has been optimized by the tap coefficient $A_k$ that generates a most suitable determination signal S2 for the test signal.

In a case where the waveform equalization characteristic of the DFE circuit 12 is determined as not being optimized (S22; no), the processing proceeds to S24. In S24, the control circuit 13 updates the tap coefficient $A_k$ and transmits it to the DFE circuit 12, then, returns to S20.

In a case where the waveform equalization characteristic of the DFE circuit 12 is determined as being optimized (S22; yes), loop processing is ended, and the processing proceeds to S26. In S26, the control circuit 13 determines the tap coefficient $A_k$ in the last loop as a tap coefficient $A_k$opt1, and proceeds to S30.

In S30, based on the boost amount Bopt1, the control circuit 13 determines a total reduction amount M of the boost amount to be deducted from the boost amount Bopt1. The method of determining the total reduction amount M will be explained later on.

In S32, S34, S40, S42, S44, and S50, the CTLE circuit 11, the DFE circuit 12, and the control circuit 13 optimize the waveform equalization characteristic of the DFE circuit 12 with respect to the equalization signal EQ1 generated by using a boost amount Bopt2, which is smaller than the boost amount Bopt1.

Specifically, in S32, the control circuit 13 updates the boost amount B in the current loop to a boost amount B from which a boost amount reduction width Δ has been deducted. Any value may be set for the boost amount reduction width Δ. The boost amount reduction width Δ may be a value obtained by dividing the total reduction amount M equally by any number, or may be the total reduction amount M.

In S34, based on the reception signal RCV, the CTLE circuit 11 executes linear equalization processing by applying the boost amount B updated in S32, and generates the equalization signal EQ1.

Since the operations in S40 through S44 are the same as the operations in S10 to S24, the explanations thereof will be omitted.

In a case where the waveform equalization characteristic of the DFE circuit 12 is determined as being optimized in S42 (S42; yes), the processing proceeds to S50. In S50, the control circuit 13 determines whether or not the boost amount B of the current loop has been reduced from the boost amount Bopt1 by the total reduction amount M.

In a case where the boost amount B in the current loop is determined as not yet having the total reduction amount M reduced from the boost amount Bopt1 (S50; no), the processing returns to S32, and the control circuit 13 recursively executes S32 through S50 on the other hand, in a case where the boost amount B in the current loop is determined as having the total reduction amount M reduced from the boost amount Bopt1 (S50; yes), the control circuit 13 ends the loop processing and proceeds to S52.

In S52, the control circuit 13 determines the boost amount B and the tap coefficient $A_k$ in the last loop respectively as a boost amount Bopt2 and a tap coefficient $A_k$opt2, and uses the determined value upon regular operations thereafter.

Hereby, the waveform equalization operation of the equalizer 10 is ended.

As mentioned above, the total reduction amount M that is determined in S30 is determined in accordance with the boost amount Bopt1. FIG. 7 is a table for explaining the relationship between the boost amount Bopt1 and the total reduction amount M in the equalizer according to the first embodiment.

As shown in FIG. 7, the total reduction amount M may be set to a larger value as the boost amount Bopt1 increases. Specifically, for example, the control circuit 13 may be set in advance so that in a case where the boost amount Bopt1 is 1 through 10 dB, 11 through 20 dB, 21 through 30 dB, 31 through 40 dB, and 41 through 50 dB, the total reduction amount M respectively becomes 0 dB, 5 dB, 10 dB, 15 dB, and 20 dB. The example of FIG. 7 is merely an example. Any coordination would be possible between the boost amount Bopt1 and the total reduction amount M.

1.3 Advantageous Effects of Present Embodiment

According to the first embodiment, noise amplification can be suppressed while compensating for the ISI. This effect will be explained below.

Although the CTLE circuit 11 is capable of appropriately compensating for the ISI, since the reception signal RCV is directly amplified, the noise included in the reception signal RCV is also amplified. Therefore, in terms of noise reduction, the boost amount B is desired to be made small. On the other hand, since the DFE circuit 12 feeds back the determination signal, the noise would not be amplified. However, with a clock signal CLK that is generated based on a reception signal RCV with great loss, it would be difficult for the DFE circuit 12 to operate properly. Accordingly, in order to operate the DFE circuit 12 properly, it is desired to generate the equalization signal EQ1 for which the ISI is compensated to some extent by the CTLE circuit 11 in advance, and to generate the clock signal CLK based on such equalization signal EQ1.

According to the first embodiment, first, the control circuit 13 adaptively controls the CTLE circuit 11 with respect to the reception signal RCV, and determines the boost amount Bopt1. In this manner, even in a case where the transmission characteristics of the transmission path 4 may change according to circumstances, the CTLE circuit 11 would be able to generate the equalization signal EQ1 by using an optimal boost amount Bopt1. The control circuit 13 also adaptively controls the DFE circuit 12 with respect to the equalization signal EQ1, and determines the tap coefficient $A_k$dopt1. In this manner, the DFE circuit 12 would be able to generate the equalization signal EQ2 by using an optimal tap coefficient $A_k$opt1 in accordance with the boost amount Bopt1 of the CTLE circuit 11.

The boost amount Bopt1 becomes a value in which a waveform equalization ability of the CTLE circuit 11 contributes the most in a case where the CTLE circuit 11 and the DFE circuit 12 are combined to compensate for the ISI. Therefore, by searching for a boost amount B that is smaller than the boost amount Bopt1, there is a possibility that a combination that is capable of reducing the influence of noise while possessing a waveform equalization characteristic equivalent to a case of using the boost amount Bopt1 and the tap coefficient $A_k$opt1 can be detected.

Specifically, based on the boost amount Bopt1, the control circuit 13 determines the boost amount Bopt2 which is smaller than the boost amount Bopt1. The control circuit 13 adaptively controls the DFE circuit 12 with respect to the equalization signal EQ1 generated by using the boost amount Bopt2, and determines the tap coefficient $A_k$opt2. Since the boost amount Bopt2 is smaller than the boost amount Bopt1, the influence of noise can be reduced. Furthermore, since the value of the tap coefficient $A_k$opt2 is also updated along with the above incident, the value of the boost amount B can be made small without degrading the waveform equalization characteristic that is obtained by combining the CTLE circuit 11 and the DFE circuit 12. Accordingly, the noise amplification can be suppressed while compensating for the ISI.

In a case where an appropriate clock signal CLK is obtained, the control circuit 13 may perform the change from the boost amount Bopt1 to the boost amount Bopt2 all at once. By changing the boost amount B all at once, the number of loops in the adaptive control using the DFE circuit 12 can be done at one time. Therefore, the time required for an entire waveform equalization operation can be shortened.

Alternatively, the control circuit 13 may also reduce the boost amount Bopt1 gradually per boost amount reduction width Δ, and optimize the waveform equalization characteristic of the DFE circuit 12 at each occasion. By gradually reducing the boost amount B, the boost amount B and the tap coefficient $A_k$ can be changed gradually. Therefore, rapid changes in the waveform equalization characteristic that is obtained by combining the CTLE circuit 11 and the DFE circuit 12 can be suppressed.

1.4 Modified Example of First Embodiment

The first embodiment is not limited t0 the above-mentioned example, and can be modified in various ways. For example, in the first embodiment, the control circuit 13 adaptively controls the CTLE circuit 11 with respect to the reception signal RCV, and determines the boost amount Bopt1. However, the first embodiment is not limited to this.

Figure 8:
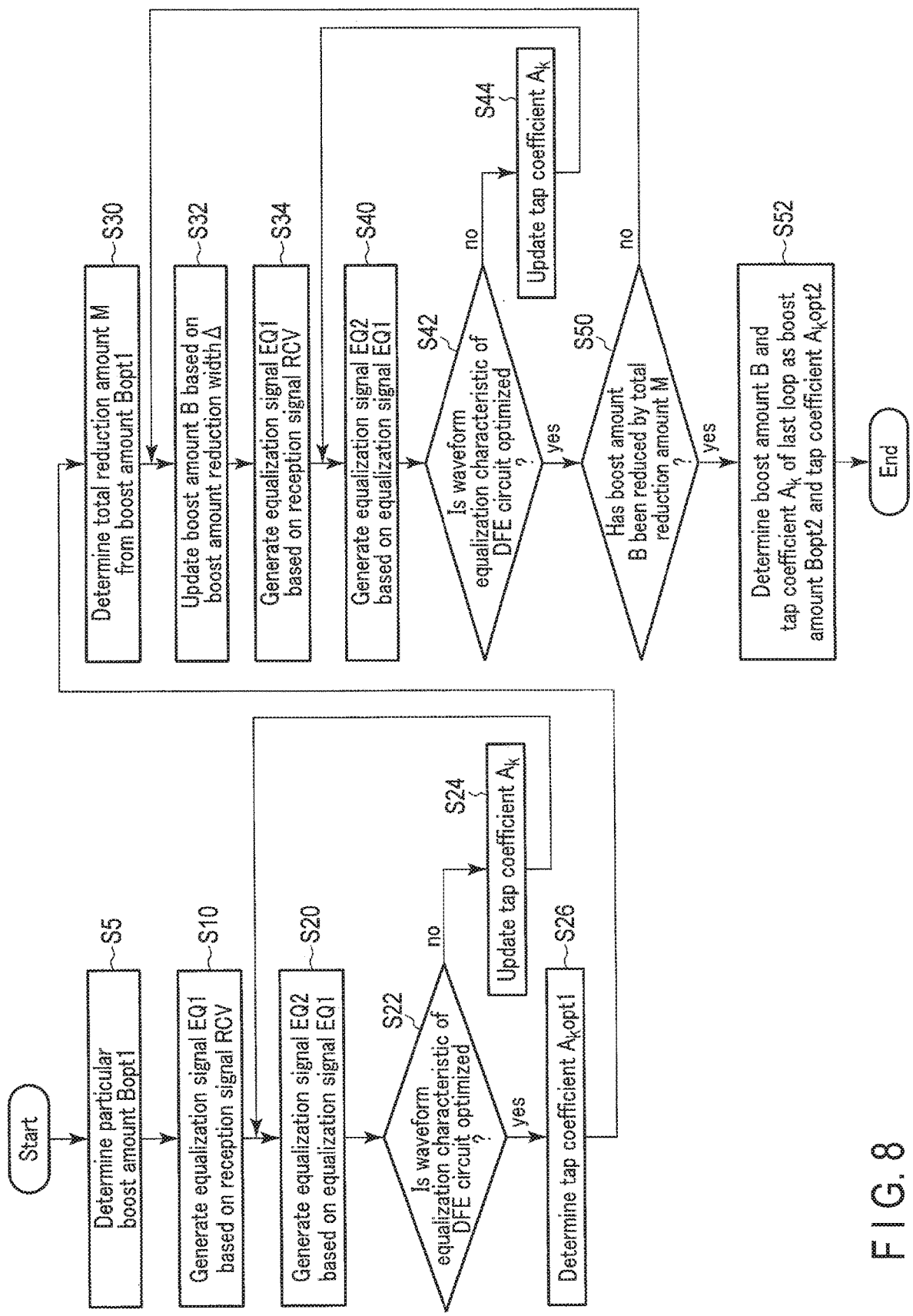
FIG. 8 is a flowchart for explaining a waveform equalization operation of an equalizer circuit according to a modified example of the first embodiment.

FIG. 8 is a flowchart for explaining a waveforms equalization operation of an equalizer according to a modified example of the first embodiment. FIG. 8 corresponds to FIG. 6 explained in the first embodiment, and includes S5 and S10 instead of S10 through S16 of FIG. 6.

As shown in FIG. 8, in S5, the control circuit 13 determines a particular value for a boost amount Bopt1.

In S10, based on a reception signal RCV, a CTLE circuit 11 generates an equalization signal EQ1 using the boost amount Bopt1.

Since the operations thereafter are the same as those of FIG. 6 explained in the first embodiment, explanations will be omitted.

By the above-mentioned operation, for example, in a case where the transmission characteristic of the transmission path 4 is known, and the transmission characteristic is known to not vary significantly, in the same manner as the first embodiment, noise amplification can be suppressed while compensating for the ISI. Since the adaptive control using the CTLE circuit 11 can be omitted, the time required for an entire waveform equalization operation can be shortened.

2. Second Embodiment

An equalizer according to a second embodiment will be explained. The equalizer according to the first embodiment was configured to determine the total reduction amount M of the boost amount in accordance with the magnitude of the boost amount Bopt1. On the other hand, the equalizer according to the second embodiment is configured to evaluate an equalization characteristic by directly monitoring an eye pattern of a generated equalization signal, and determines a boost amount Bopt2 from among the boost amounts that satisfy a particular equalization characteristic. In the following, the same reference symbols as used in the first embodiment will be used for the same constituent elements, and detailed explanations thereof will be omitted. Only parts different from the first embodiment will be explained.

2.1 Configuration of Equalizer

A configuration of the equalizer according to the second embodiment will be explained using FIG. 9. FIG. 9 corresponds to FIG. 3 of the first embodiment.

As shown in FIG. 9, an equalizer 10 further includes an eye monitor circuit 14.

The eye monitor circuit 14 receives an equalization signal EQ2 from a DFE circuit 12, and monitors an eye pattern of the equalization signal EQ2. The eye monitor circuit 14 generates a monitor result of the eye pattern, and transmits the result to a control circuit 13. Based on the monitor result of the eye pattern, the control circuit 13 evaluates an aperture of the eye pattern.

In the following, a specific example of the monitor result and the aperture of the eye pattern will be explained using FIG. 10.

FIG. 10 is a schematic diagram showing the eye pattern monitored by the eye monitor circuit according to the second embodiment.

As shown in FIG. 10, the eye pattern is visualized by superimposing a plurality of equalization signals EQ2 by a clock signal CLK serving as a trigger. Generally, the larger a center part of the eye pattern opens, more correctly a decoding of the signal is performed. Therefore, the eye monitor circuit 14 measures a height H and a width W of the eye pattern as the monitor result based on, for example, the eye pattern of the equalization signal EQ2. Without being limited to the above-mentioned example, the eye monitor circuit 14 may measure other characteristic amounts of the eye pattern as the monitor result. In other words, the monitor result includes the height H, the width W, and other characteristic amounts of the eye pattern.

Based on these characteristic amounts, the control circuit 13 evaluates the aperture of the eye pattern. The aperture is, for example, calculated by any function that increases as the values of the height H and the width W increase.

2.2 Operation of Equalizer

Figure 11:
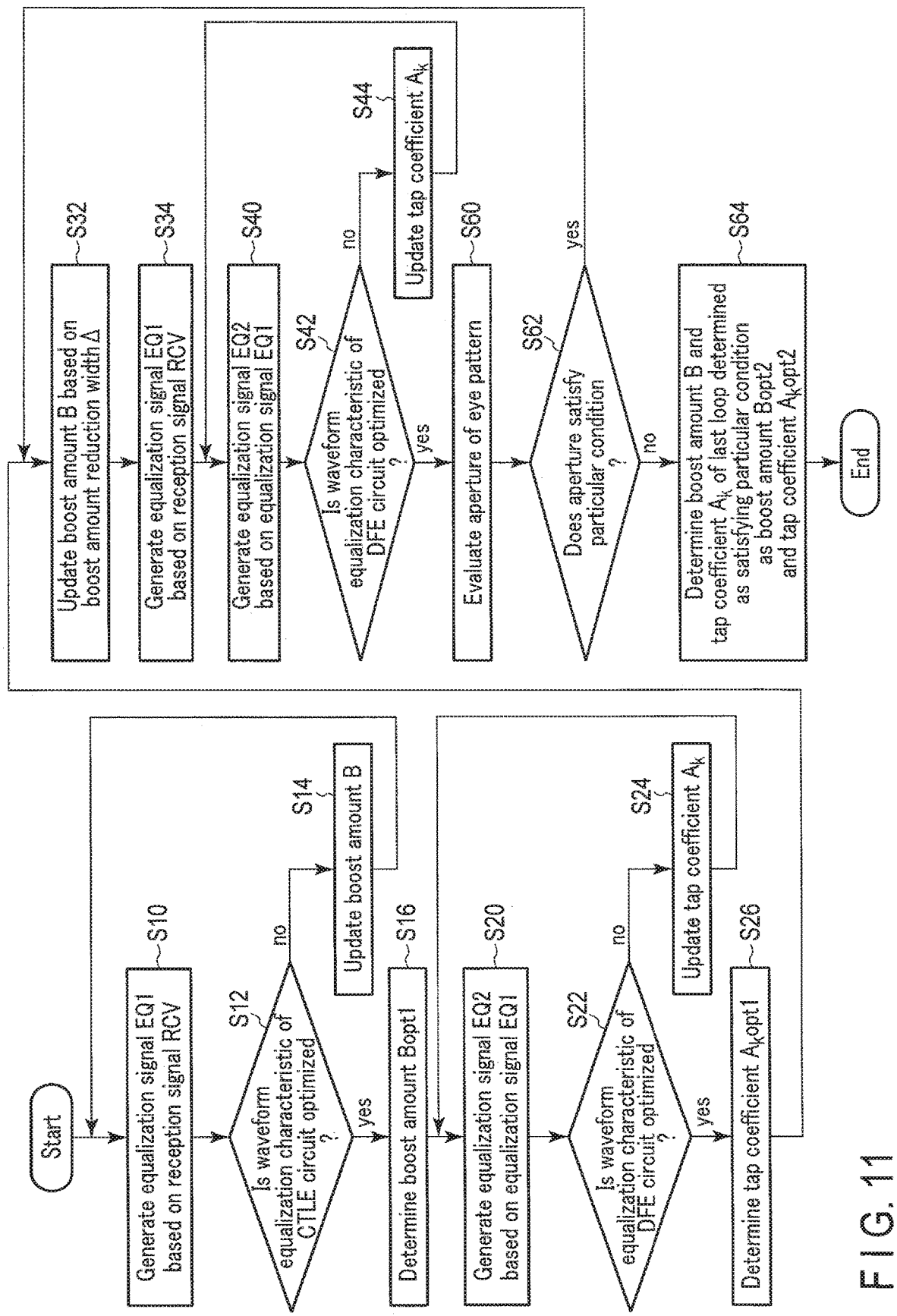
FIG. 11 is a flowchart for explaining a waveform equalization operation of the equalizer circuit according to the second embodiment.

An operation of the equalizer according to the second embodiment will be explained. FIG. 11 is a flowchart for explaining a waveform equalization operation of the equalizer according to the second embodiment.

As shown in FIG. 11, since operations of S10 through S26 are the same as those explained in FIG. 6 in the first embodiment, explanations thereof will be omitted.

Subsequently, in FIG. 11, S32 is executed without executing S30. In other words, in S32, the control circuit 13 does not determine the total reduction amount M. The control circuit 13 updates a boost amount E in a current loop to a boost amount B from which a boost amount reduction width Δ has been deducted. Any value may be set for the boost amount reduction width Δ.

In S34, based on a reception signal RCV, the CTLE circuit 11 executes linear equalization processing by applying the boost amount B updated in S32, and generates an equalization signal EQ1.

Since operations in S40 through S44 are the same as the operations in S10 through S24, the explanations thereof will be omitted.

In the case where the waveform equalization characteristic of the DFE circuit 12 is determined as being optimized in S42 (S42; yes), the processing proceeds to S60. In S60, the eye monitor circuit 14 monitors the eye pattern of the equalization signal EQ2 transmitted from the DFE circuit 12, and generates a monitor result. When receiving the monitor result from the eye monitor circuit 14, the control circuit 13 evaluates the aperture of the eye pattern.

In S62, the control circuit 13 determines whether or not the aperture of the eye pattern satisfies a particular condition. In a case where it is determined that the aperture satisfies the particular condition (S62; yes), the processing returns to S32, and the control circuit 13 recursively executes S32 through S62. On the other hand, in a case where it is determined that the aperture does not satisfy the particular condition (S62; no), the control circuit 13 ends the loop processing and proceeds to S64. "The aperture satisfies the particular condition" refers to, for example, "the aperture of the eye pattern being large enough for information in a transmission signal TR to be decoded from the equalization signal EQ2".

In S64, the control circuit 13 determines the boost amount B and a tap coefficient $A_k$ in the last loop determined as satisfying the particular condition, as a boost amount Bopt2 and a tap coefficient $A_k$opt2, respectively, and applies them to regular operations thereafter. In other words, the control circuit 13 determines a smallest boost amount B at which the aperture would satisfy the particular condition as the boost amount Bopt2. The control circuit 13 also determines the tap coefficient $A_k$ that is optimized in accordance with the boost amount Bopt2 as the tap coefficient $A_k$opt2.

Hereby, the waveform equalization operation of the equalizer 10 is ended.

2.3 Advantageous Effects of Present Embodiment

According to the second embodiment, the equalizer 10 includes the eye monitor circuit 14 that monitors the eye pattern. The control circuit 13 determines the smallest boost amount B at which the aperture of the eye pattern would satisfy the particular condition as the boost amount Bopt2. In this manner, the smallest boost amount B can be detected by a search conducted by the loop processing of S32 through S62 in a range where the waveform equalization characteristic obtained by the combination of the CTLE circuit 11 and the DFE circuit 12 would not be degraded. Accordingly, the influence of noise can be reduced as much as possible while compensating for the ISI in an admissible range.

2.4 Modified Example of Second Embodiment

The second embodiment is not limited to the above-mentioned example, and can be modified in various ways. For example, in the second embodiment, a case in which the control circuit 13 determines the smallest boost amount B within a range in which the monitor result of the eye monitor circuit 14 satisfies the particular condition as the boost amount Bopt2 has been explained. However, the second embodiment is not limited to this.

Figure 12:
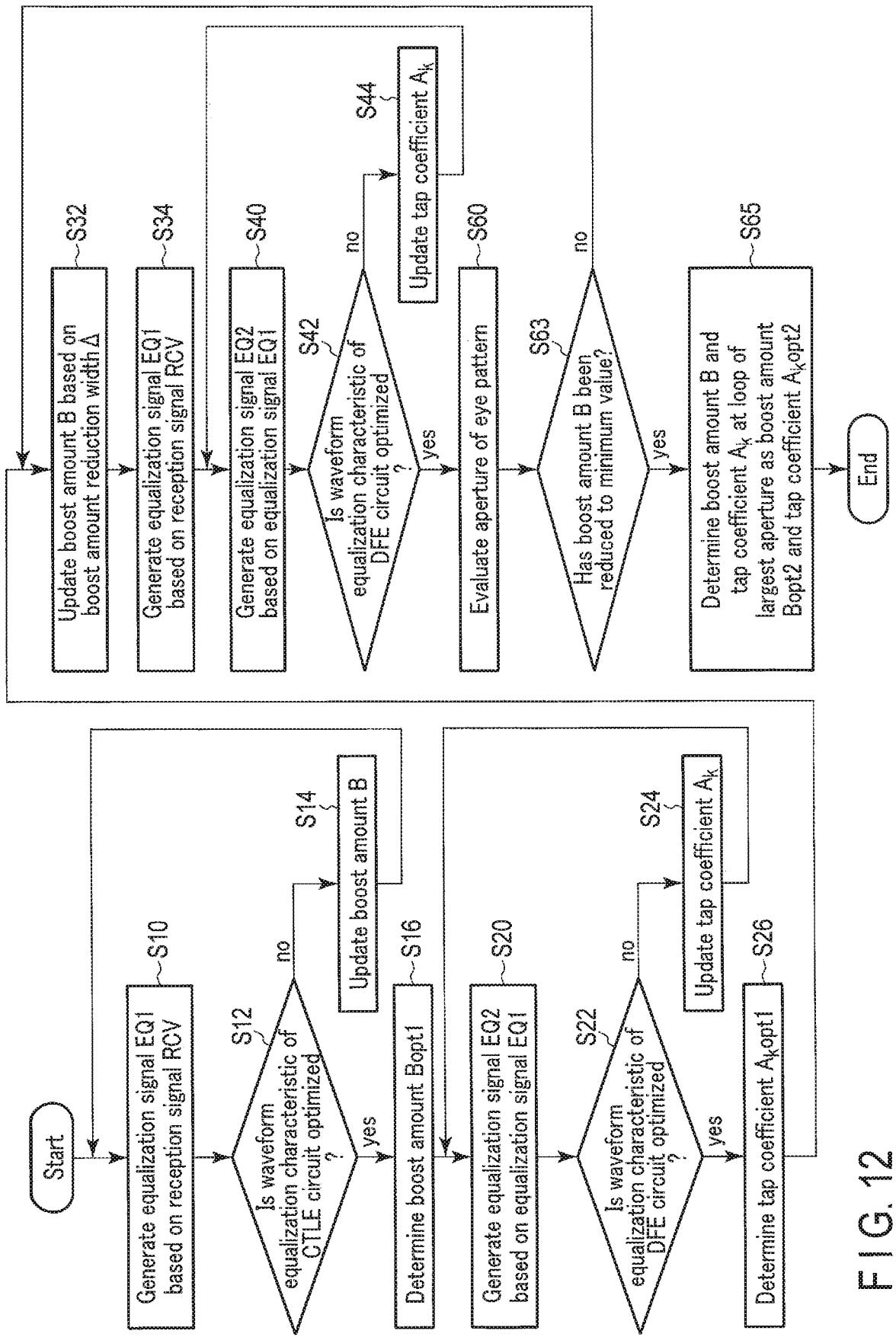
FIG. 12 is a flowchart for explaining a waveform, equalization operation of an equalizer circuit according to a modified example of the second embodiment.

FIG. 12 is a flowchart for explaining a waveform equalization operation of an equalizer according to a modified example of the second embodiment. FIG. 12 corresponds to FIG. 11 explained in the second embodiment, and includes S63 and S65 instead of S62 and S64 of FIG. 11.

As shown in FIG. 12, since operations in S10 through S44 are the same as the operations in S10 through S44 in FIG. 11, explanations thereof will be omitted.

In the case where a waveform equalization characteristic of a DFE circuit 12 is determined as being optimized in S42 (S42; yes), the processing proceeds to S60. In S60, an eye monitor circuit 14 monitors an eye pattern of an equalization signal EQ2 transmitted from the DFE circuit 12, and generates a monitor result. When receiving the monitor result from the eye monitor circuit 14, a control circuit 13 evaluates an aperture of the eye pattern, and keeps the evaluation until the waveform equalization operation is ended.

In S63, the control circuit 13 determines whether or not a boost amount B applied to a CTLE circuit 11 in a current loop has been reduced to a smallest value as a result of S32. The smallest value is, for example, 0 dB; however, is not limited to this, and may be set to a certain threshold value.

In a case where the boost amount B is determined not being reduced to the smallest value (S63; no), the processing returns to S32, and the control circuit 13 recursively executes S32 through S563. On the other hand, in a case where the boost amount B is determined as being reduced to the smallest value (S63; yes), the control circuit 13 ends the loop processing and proceeds to S65.

When the loop processing is ended, the control circuit 13 reads out an evaluation result for each loop processing. In S65, the control circuit 13 determines the boost amount B and a tap coefficient $A_k$ in a loop with the largest aperture as a boost amount Bopt2 and a tap coefficient $A_k$opt2, respectively, and applies them to regular operations thereafter.

Hereby, the waveform equalization operation of the equalizer 10 is ended.

By the above operation, the equalizer 10 changes the boost amount B in any possible range, adaptively controls the DFE circuit 12 in each of the cases, and generates the equalization signal EQ2. The eye monitor circuit 14 generates the monitor result of the eye pattern of the equalization signal EQ2 in all cases of changing the boost amount B. The control circuit 13 evaluates all of the monitor results, and determines the boost amount B and the tap coefficient $A_k$ that may generate the equalization signal EQ2 with the largest aperture of the eye pattern as the boost amount Bopt2 and the tap coefficient $A_k$opt2, respectively. In this manner, the boost amount B in which the waveform equalization characteristic obtained by the combination of the CTLE circuit 11 and the DFE circuit 12 becomes most favorable can be detected by a search conducted by the loop processing of S32 through S62. Accordingly, the ISI and noise influence can be minimized.

3. Third Embodiment

An equalizer according to a third embodiment will be explained. The equalizers according to the first embodiment and the second embodiment are configured on the premise that the clock signal CLK, which is capable of stably operating the DFE circuit 12, is obtained. However, generally, it is difficult to generate a stable clock signal CLK at a reception circuit 6 side. In a case where the clock signal CLK is unstable, in some cases, the DFE circuit 12 would not be stably operated. Therefore, the equalizer according to the third embodiment has a configuration that is capable of extracting correct clock timing from a reception signal RCV in order to obtain a stable clock signal CLK. In the following, the same reference symbols as used in the second embodiment will be used for the same constituent elements, and detailed explanations thereof will be omitted. Only parts different from the second embodiment will be explained.

3.1 Configuration of Equalizer

A configuration of the equalizer according to the third embodiment will be explained using FIG. 13. FIG. 13 corresponds to FIG. 9 in the second embodiment.

As shown in FIG. 13, an equalizer 10 further includes a CDR circuit 15.

The CDR circuit 15, for example, includes a clock data recovery circuit. When an equalization signal EQ1 and a determination signal S1 are received from a DFE circuit 12, the CDR circuit 15 detects a phase shift between these signals, and outputs a clock signal CLK in accordance with the phase shift. The DFE circuit 12 uses the clock signal CLK to generate a determination signal S1 whose phase shift from the equalization signal EQ1 is small. By receiving a feedback of the determination signal S1, the CDR circuit 15 outputs a clock signal CLK that is capable of making the phase shift smaller. Eventually, the CDR circuit 15 outputs a clock signal CLK that is capable of synchronizing the phases of the equalization signal EQ1 and the determination signal S1.

A state in which the phases are synchronized in the manner mentioned above is also referred to as a "CDR circuit 15 locked state". In a case of being locked, the CDR circuit 15 may transmit a lock signal indicating that the CDR circuit 15 is locked.

In the above manner, the DFE circuit 12 can operate stably based on the clock signal CLK that has been stabilized by the CDR circuit 15.

3.2 Operation of Equalizer

An operation of the equalizer according to the third embodiment will be explained.

Figure 14:
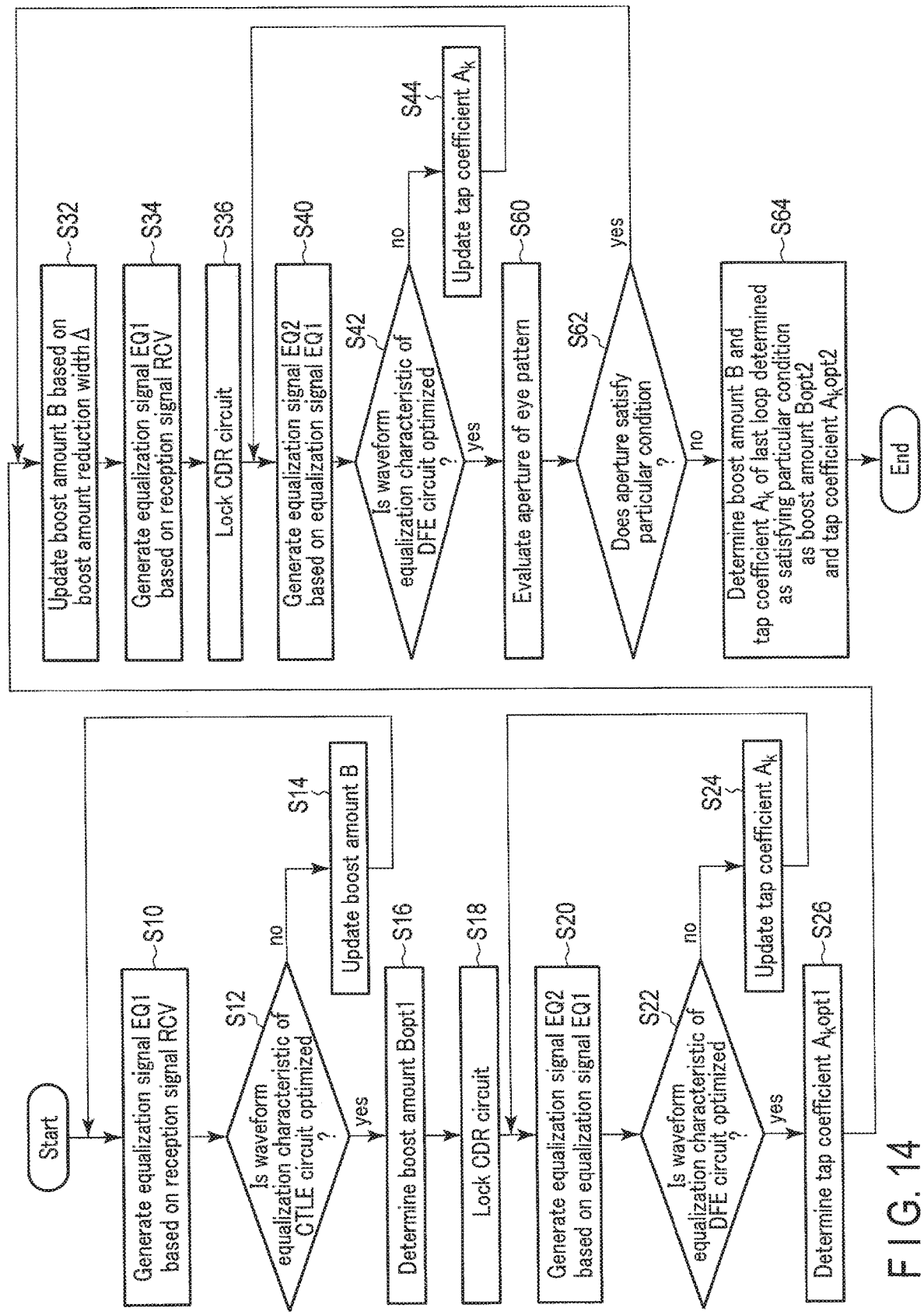
FIG. 14 is a flowchart for explaining a waveform equalization operation of the equalizer circuit according to the third embodiment.

FIG. 14 is a flowchart for explaining a waveform equalization operation of the equalizer according to the third embodiment. FIG. 14 corresponds to FIG. 11 explained in the second embodiment. In FIG. 14, in addition to each of the operations in FIGS. 11, S18 and S36 are further added.

As shown in FIG. 14, in S10 through S16, a waveform equalization characteristic of a CTLE circuit 11 is optimized with respect to the reception signal RCV, and a boost amount Bopt1 is determined.

In S18, the CDR circuit 15 is locked by the equalization signal EQ1 and the determination signal S1 generated based on the boost amount Bopt1. In this manner, the clock signal CLK is stabilized, and the DFE circuit 12 is able to operate with stability in the subsequent S20 through S24.

In S20 through S26, based on the clock signal CLK input from the CDR circuit 15, the waveform equalization characteristic of the DFE circuit 12 is optimized with respect to the equalization signal EQ1, and a tap coefficient $A_k$opt1 is determined.

In S32, the control circuit 13 updates the boost amount B in the current loop to a boost amount B from which a boost amount reduction width $\Delta$ has been deducted. When the boost amount B is changed significantly at a time, there is a possibility that the significant change in the shape of the equalization signal EQ1 may cause the phase shift from the determination signal S1 to increase excessively, and may unlock the CDR circuit 15. Therefore, any value may be set for the boost amount reduction width $\Delta$ as long as it is a value that would not unlock the CDR circuit 15.

In S34, based on the reception signal RCV, the CTLE circuit 11 executes linear equalization processing by applying the boost amount B updated in S32, and generates the equalization signal EQ1.

In S36, the CDR circuit 15 is locked by the equalization signal EQ1 and the determination signal S1 generated based on the boost amount B updated in S32. In this manner, the clock signal CLK is also stabilized in the updated boost amount B, which allows the DFE circuit 12 to operate with stability in the subsequent S40 through S44.

In S40 through S44, based on the clock signal CLK input from the CDR circuit 15, the waveform equalization characteristic of the DFE circuit 12 is optimized with respect to the equalization signal EQ1.

Since operations in S60 through S64 are the same as the operations in S60 through S64 of FIG. 11, the explanations thereof will be omitted.

Hereby, the waveform equalization operation of the equalizer 10 is ended.

3.3 Advantageous Effects of Present Embodiment

According to the third embodiment, the equalizer 10 further includes the CDR circuit 15 that generates the clock Signal CLK that synchronizes with the equalization signal EQ1. This allows the DFE circuit 12 to generate the determination signal S1 that is in sync with the equalization signal EQ1. Therefore, a feedback appropriately functions when generating the equalization signal EQ2, which allows the tap coefficient $A_k$ to be appropriately updated. Accordingly, an adaptive control using the DFE circuit 12 can be operated with stability.

In S32, when the boost amount B is significantly reduced at a time, an eye pattern of the equalization signal EQ1 may change significantly. In this case, there is a possibility that the shape of the eye pattern may temporary collapse, and the CDR circuit 15 may become unlocked. In the third embodiment, the boost amount reduction width Δ is set small enough for the CDR circuit 15 to remain locked. In this manner, in the loop of S32 to S50, the eye pattern of the equalization signal EQ1 can be suppressed from changing, and the lock of the CDR circuit 15 can be maintained.

3.4 Modified Example of Third Embodiment

The third embodiment is not limited to the above-mentioned example, and can be modified in various ways. For example, the third embodiment is similarly applicable to the modified example of the second embodiment and the first embodiment.

Figure 16:
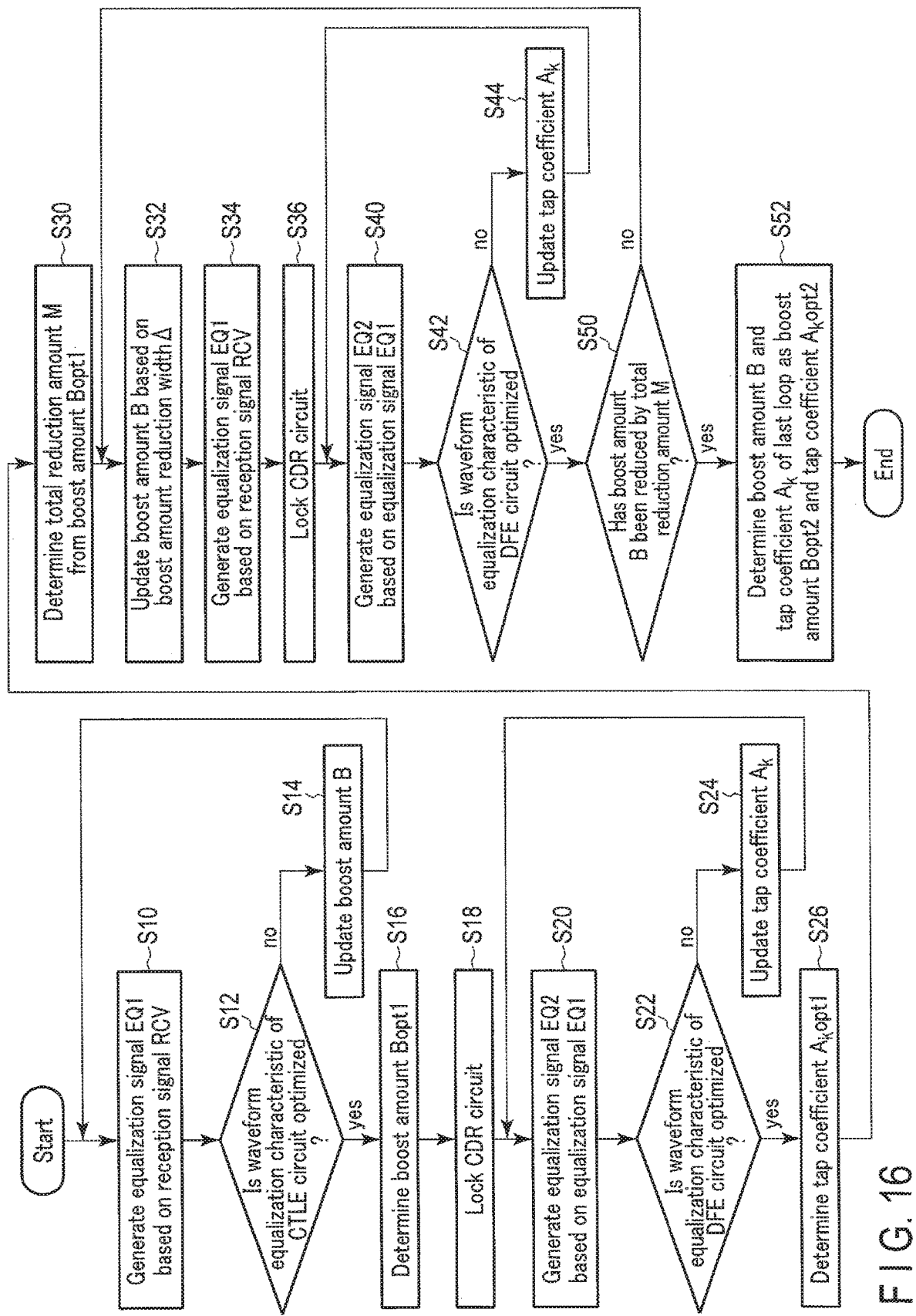
FIG. 16 is a flowchart for explaining a waveform equalization operation of an equalizer circuit according to another modified example of the third embodiment.

FIGS. 15 and 16 are flowcharts for explaining a waveform equalization operation of an equalizer according to a modified example of the third embodiment. FIG. 15 corresponds to FIG. 12 explained in the modified example of the second embodiment, and further includes S18 and S36 in addition to each of the operations in FIG. 12. FIG. 16 corresponds to FIG. 6 explained in the first embodiment, and further includes S18 and S36 in addition to each of the operations in FIG. 6.

By adding S18 and S36 to the modified example of the second embodiment and the first embodiment, the same effect as the third embodiment can be exercised.

4. Fourth Embodiment

An equalizer according to a fourth embodiment will be explained. In the equalizers according to the first embodiment to the third embodiment, a configuration in which the DFE circuit 12 compensates for the ISI that has been increased by suppressing the boost amount B of the CTLE circuit 11 lower has been explained. In the fourth embodiment, by using other equalization circuits (Feed Forward Equalizer (FFE) circuit) in addition to the DFE circuit 12, a configuration that allows further compensation of the ISI increased along with suppressing the boost amount B of the CTLE circuit 11 is presented. In the following, the same reference symbols as used in the first embodiment will be used for the same constituent elements, and explanations thereof will be omitted or simplified. Only configurations different from the first embodiment will be explained.

4.1 Configuration of Linear Equalizer

A configuration of a linear equalizer according to the fourth embodiment will be explained.

Figure 17:
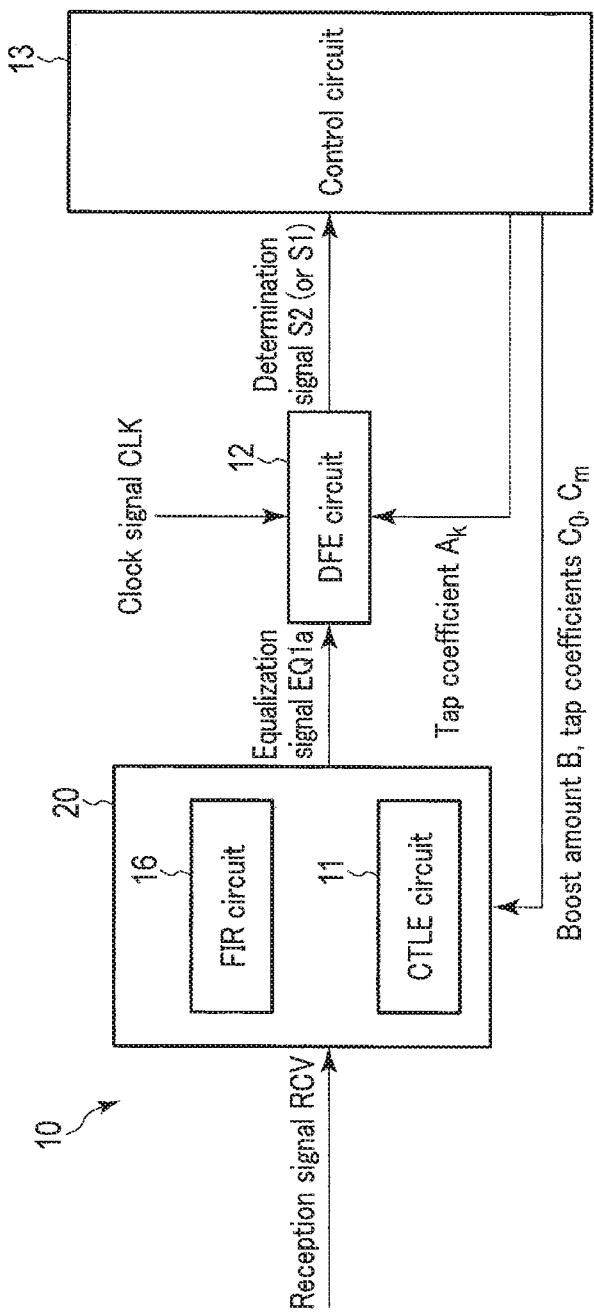
FIG. 17 is a block diagram for explaining a configuration of an equalizer circuit according to a fourth embodiment.

FIG. 17 is a block diagram for explaining a configuration of an equalizer including the linear equalizer according to the fourth embodiment. FIG. 17 corresponds to FIG. 3 of the first embodiment.

As shown in FIG. 17, an equalizer 10 includes a linear equalizer 20 that includes the CTLE circuit 11. The linear equalizer 20 has a function of applying linear equalization processing to a reception signal RCV, and outputting an equalization signal EQ1a. In the example of FIG. 17, in addition to the CTLE circuit 11, the linear equalizer 20 further includes a Finite Impulse Response (FIR) circuit 16. The CTLE circuit 11 executes equalization processing for the reception signal RCV in a specific frequency domain; whereas, the FIR circuit 16 executes equalization processing for the reception signal RCV in a specific time domain. That is, in contrast to the CTLE circuit 11 that successively performs linear equalization processing with respect to a frequency domain, the FIR circuit 16 may be regarded as a Discrete Time Linear Equalizer (DTLE) circuit that discretely performs linear equalization processing with respect to a time domain. The linear equalizer 20, for example, is configured to be able to adjust a waveform equalization characteristic of the CTLE circuit 11 based on a boost amount B that is transmitted from a control circuit 13, and to adjust a waveform equalization characteristic of the FIR circuit 16 based on tap coefficients $C_0$ and $C_m$. Tap coefficients $C_0$ and $C_m$ will be explained later on.

FIG. 18 is a block diagram for explaining a configuration of the FIR circuit 16 according to the fourth embodiment. FIG. 18 shows an example of a case in which, within the linear equalizer 20, an equalization signal EQ1 output from the CTLE circuit 11 is input to the FIR circuit 16, and an equalization signal EQ1a is output.

As shown in FIG. 18, the FIR circuit 16 includes a plurality of delay circuits 161 (161-1, 161-2, ..., 161-j), a plurality of buffer circuits 162 and 163 (163-1, 163-2, ..., 163-j), and an adder 164 (j is an optional natural number). Among a waveform corresponding to certain data within an input signal, the FIR circuit 16 has a function of reducing a portion that interferes with a waveform corresponding to other data preceding the certain data.

In the explanation hereinafter, as a matter of convenience, the equalization signal EQ1 that is not delayed with respect to a reference time will be described as an equalization signal EQ1(0). Furthermore, each of signals that coincides with the equalization signal EQ1(0) after being delayed by particular times T, 2T, ..., and jT will be described as equalization signals EQ1(-T), EQ1(-2T), ..., and EQ1(-jT), respectively.

The plurality of delay circuits 161 are connected to each other in series. Each of the plurality of delay circuits 161 has a function of outputting a signal obtained by delaying an input signal by a particular time T. Specifically, at the delay circuit 161-j, an equalization signal EQ1(-jT) is input, and an equalization signal EQ1(-(j-1)T) is output. Similarly, at the delay circuit 161-2, an equalization signal EQ1(-2T) is input, and an equalization signal EQ1(-T) is output. At the delay circuit 161-1, the equalization signal EQ1(-T) is input, and the equalization signal EQ1(0) is output. In the example of FIG. 18, any time by which each of the plurality of delay circuits 161 delays a signal is expressed as time T;

however, it is not limited thereto. That is, different delay times can optionally be set for each of the plurality of delay circuits 161.

Corresponding tap coefficients $C_0$, $C_{-1}$, $C_{-2}$, ..., and $C_{-j}$ are respectively transmitted from the control circuit 13 to each of the plurality of buffer circuits 162 and 163, and are set. The tap coefficients $C_{-1}$, $C_{-2}$, ..., and $C_{-j}$ are also collectively referred to as a tap coefficient $C_m$ for a pre-cursor. The buffer circuit 162 generates a signal obtained by multiplying the equalization signal EQ1(0) that is output by the delay circuit 161-1 by a corresponding tap coefficient $C_0$, and transmits the signal to the adder 164. Furthermore, each of the plurality of buffer circuits 163-1, 163-2, ..., and 163-$j$ generates a signal, as a feedback signal, obtained by multiplying each of the equalization signals EQ1(-T), EQ1(-2T), ..., and EQ1(-jT) input to each of the corresponding delay circuits 161-1, 161-2, ..., and 161-$j$ by corresponding tap coefficient $C_{-1}$, $C_{-2}$, ..., and $C_{-j}$, and transmits each of the feedback signals to the adder 164. For example, in a case where the tap coefficient $C_0$ is a positive value, the tap coefficient $C_m$ may be set as a negative value.

The adder 164 adds the feedback signals from each of the plurality of buffer circuits 163 to the signal from the buffer circuit 162, and conclusively outputs the obtained signal as the equalization signal EQ1$a$.

By the above configuration, the linear equalizer 20 generates the equalization signal EQ1$a$ via the FIR circuit 16 and the CTLE circuit 11. In the example of FIG. 18, a case in which the output signal EQ1 from the CTLE circuit 11 is input to the FIR circuit 16 has been explained. However, an input/output relationship between the FIR circuit 16 and the CTLE circuit 11 is appropriately exchangeable.

4.2 Operation of Linear Equalizer

Figure 19:
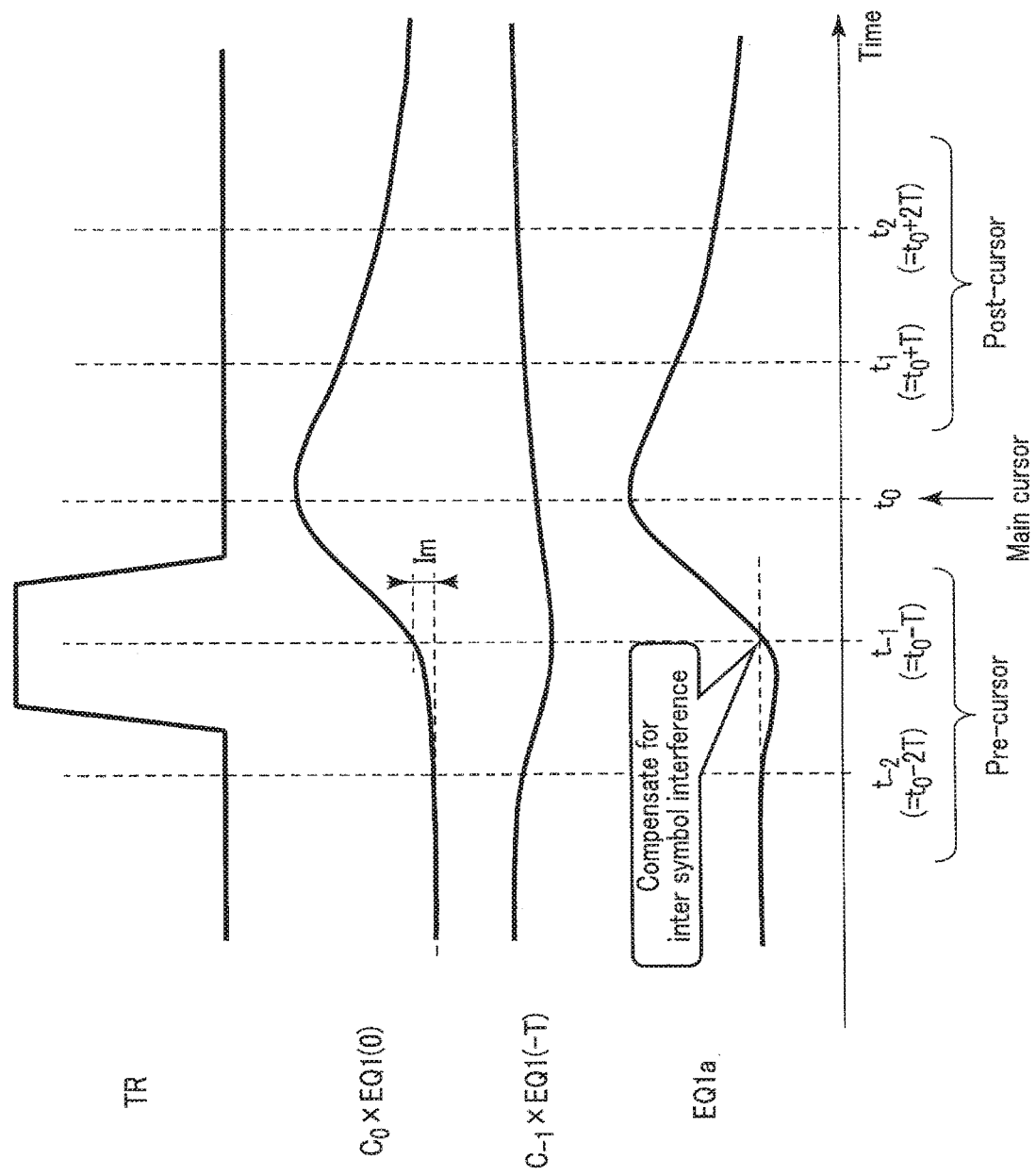
FIG. 19 is a diagram for explaining a waveform equalization operation of the linear equalizer of the equalizer circuit according to the fourth embodiment.

Now, the operation of the linear equalizer according to the fourth embodiment will be explained using FIG. 19. FIG. 19 is a diagram for explaining a waveform equalization operation of the linear equalizer according to the fourth embodiment. In FIG. 19, a part of various signals generated within the linear equalizer 20 of a reception circuit 6 in a case where one pulse signal is transmitted from a transmission circuit 2 as a transmission signal TR is illustrated.

As shown in FIG. 19, when the transmission signal TR that includes one pulse signal is output from the transmission circuit 2, after the transmission signal TR receives attenuation by a transmission path 4 and becomes a reception signal RCV, then the reception signal RCV is input to the linear equalizer 20.

The CTLE circuit 11 executes linear equalization processing that boosts a high-frequency band of the reception signal RCV, and outputs the equalization signal EQ1. In this manner, the equalization signal EQ1 is compensated (equalized) to an extent that allows a pulse shape of the transmission signal TR to be identified. In the following, the equalization signal EQ1 is explained as being sampled based on, for example, time $t_0$ as a reference time (main cursor). That is, a time at which a peak of the equalization signal EQ1(0) rises is set as time $t_0$. Sampling times $t_1(=t_0+T)$, $t_2(=t_0+2T)$, and so on that are subsequent to the main cursor are referred to as a post-cursor, and sampling times $t_{-1}(=t_0-T)$, $t_{-2}(=t_0-2T)$, and so on that precede the main cursor are referred to as a pre-cursor.

The FIR circuit 16 generates a signal ($C_0 \times$EQ1(0)) obtained by multiplying the equalization signal EQ1(0) by the tap coefficient $C_0$. The signal ($C_0 \times$EQ1(0)) has a peak at the main cursor, but has a component that may interfere with a signal that is sampled at other sampling times corresponding to both the pre-cursor and the post-cursor. For example, the signal ($C_0 \times$EQ1(0)) has an interference component Im at time $t_{-1}$ of a pre-cursor.

Furthermore, the FIR circuit 16 generates signals ($C_{-1} \times$EQ1(-T), $C_{-2} \times$EQ1(-2T), ..., and $C_{-j} \times$EQ1(-jT)) obtained by multiplying each of the equalization signals EQ1(-T) to EQ1(-jT) by corresponding tap coefficients $C_{-1}$, $C_{-2}$, ..., and $C_{-j}$. FIG. 19, a signal ($C_{-1} \times$EQ1(-T)) is shown as an example. The signal ($C_{-1} \times$EQ1(-T)) has a peak at time $t_{-1}$, and has a component with a reversed polarity of the signal ($C_0 \times$EQ1(0)). The signal ($C_{-1} \times$EQ1(-T)) is set to have a peak with an extent of magnitude that is able to compensate for the interference component Im by adjusting the tap coefficient $C_{-1}$.

Therefore, the equalization signal EQ1 that is conclusively output from the FIR circuit 16 becomes a waveform from which the interference component Im is removed at time $t_{-1}$. In other words, the FIR circuit 16 is able to increase a pre-shoot amount with respect to a signal to be sampled at the main cursor to an extent capable of removing the interference component Im. By performing the same adjustment as the tap coefficient $C_{-1}$ also for the tap coefficients $C_{-2}$, ..., and $C_{-j}$, the FIR circuit 16 is able to compensate for the interference component corresponding to any pre-cursor in the equalization signal EQ1(0).

As explained in the first embodiment, the interference component corresponding to any post-cursor in the equalization signal EQ1(0) can be compensated by the DFE circuit 12.

4.3 Operation of Equalizer

Figure 20:
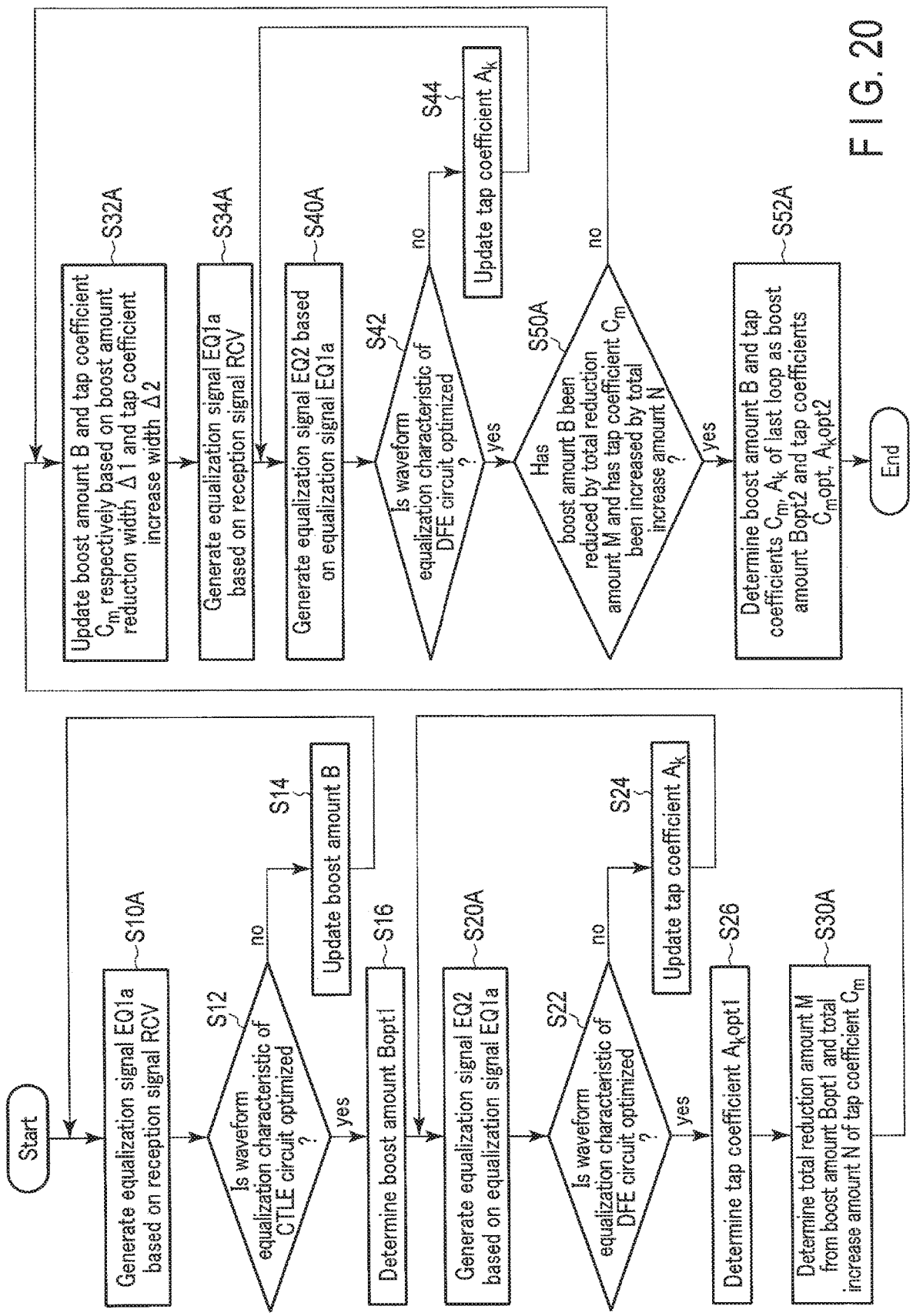
FIG. 20 is a flowchart for explaining a waveform equalization operation of the equalizer circuit according to the fourth embodiment.

An operation of the equalizer according to the fourth embodiment will be explained using FIG. 20. FIG. 20 is a flowchart for explaining an adaptive waveform equalization operation of the equalizer according to the fourth embodiment. FIG. 20 corresponds to FIG. 6 in the first embodiment, and shows an example of a method for determining the boost amount B, and the tap coefficients $C_m$ and $A_k$ for obtaining a waveform equalization characteristic that is capable of optimally compensating for the transmission characteristic of the transmission path 4.

As shown in FIG. 20, in S10A, S12, S14, and S16, the linear equalizer 20 and the control circuit 13 optimize the waveform equalization characteristic of the CTLE circuit 11 with respect to the reception signal RCV.

Specifically, in S10A, when receiving the reception signal RCV, the linear equalizer 20 generates the equalization signal EQ1$a$ based on the reception signal RCV. In S10A, the FIR circuit 16, for example, may be set so as not to substantially function ("1" is set to the tap coefficient $C_0$, and "0" is set to the tap coefficient $C_m$). Accordingly, in S10A to S16, in the same manner as the first embodiment, the boost amount B of the CTLE circuit 11 is optimized to a boost amount Bopt1.

Subsequently, in S20A, S22, S24, and S26, the DFE circuit 12 and the control circuit 13 optimize the waveform equalization characteristic of the DFE circuit 12 with respect to the equalization signal EQ1$a$ generated by using the boost amount Bopt1. Therefore, in the same manner as the first embodiment, the tap coefficient $A_k$ of the DFE circuit 12 is optimized to a tap coefficient $A_k$opt1.

Subsequently, in S30A, based on the boost amount Bopt1, the control circuit 13 determines a total reduction amount M of a boost amount to be reduced from the boost amount Bopt1 and determines a total increase amount N of the tap coefficient $C_m$ to be applied to the FIR circuit 16. In the same manner as, for example, the determination method of the total reduction amount M explained in FIG. 7, the total increase amount N is determined in accordance with a value of the boost amount Bopt1. For example, the total increase amount N is set to a larger value as the boost amount Bopt1 increases.

In S32A, S34A, S40A, S42, S44, and S50A, the FIR circuit 16, the CTLE circuit 11, the DFE circuit 12, and the control circuit 13 optimize the waveform equalization characteristic of the DFE circuit 12 with respect to the equalization signal EQ1a generated by using a boost amount Bopt2, which is smaller than the boost amount Bopt1, and the tap coefficient $C_m$ that is increased from an initial value.

Specifically, in S32A, the control circuit 13 updates the boost amount B to a boost amount B that is reduced by a boost amount reduction width Δ1, and updates the tap coefficient $C_m$ to a tap coefficient $C_m$ increased by a tap coefficient increase width Δ2 in a current loop. Any value can be set for the boost amount reduction width Δ1 and the tap coefficient increase width Δ2. Each of the boost amount reduction width Δ1 and the tap coefficient increase width Δ2 may be a value obtained by equally dividing the total reduction amount M and the total increase amount N by any number, or may be the total reduction amount M and the total increase amount N.

In S34A, based on the reception signal RCV, the linear equalizer 20 executes linear equalization processing by applying the boost amount B and the tap coefficient $C_m$ updated in S32A, and generates the equalization signal EQ1a.

Since the operations in S40A to S44 are the same as the operations in S20A to S24, the explanations thereof will be omitted, or simplified.

In the case where the waveform equalization characteristic of the DFE circuit 12 is determined as being optimized in S42 (S42; yes), the processing proceeds to S50A. In S50A, the control circuit 13 determines whether or not the boost amount B has been reduced from the boost amount Bopt1 by the total reduction amount M, and the tap coefficient $C_m$ has been increased from the initial value (for example, "0") by the total increase amount N in the current loop.

In a case where the reduction amount of the boost amount B and the increase amount of the tap coefficient $C_m$ in the current loop are determined to have not respectively reached the total reduction amount M and the total increase amount N (S50A; no), the processing returns to S32A, and the control circuit 13 recursively executes S32A to S50A. On the other hand, in a case where the reduction amount of the boost amount B and the increase amount of the tap coefficient $C_m$ in the current loop are determined to have respectively reached the total reduction amount M and the total increase amount N (S50A; yes), the control circuit 13 ends the loop processing, and proceeds to S52A.

In S52A, the control circuit 13 determines the boost amount B and the tap coefficients $C_m$ and $A_k$ in the last loop respectively as a boost amount Bopt2 and tap coefficients $C_m$opt2 and $A_k$opt, and uses the determined values upon regular operations thereafter.

Hereby, the waveform equalization operation of the equalizer 10 is ended.

4.4 Advantageous Effects of Present Embodiment

According to the fourth embodiment, the equalizer 10 further includes the FIR circuit 16 in addition to the CTLE circuit 11 as the linear equalizer 20. The FIR circuit 16 has a function for removing the ISI at a pre-cursor by adjusting the tap coefficient $C_m$. Upon carrying out the adaptive control method explained in the first embodiment, the control circuit 13 reduces the boost amount Bopt1 by the total reduction amount M based on the magnitude of the boost amount Bopt1, and increases the tap coefficient $C_m$ by the total increase amount N. The control circuit 13 then optimizes the tap coefficient $A_k$ of the DFE circuit 12 with respect to the equalization signal EQ1a obtained based on the updated boost amount B and the tap coefficient $C_m$.

Among the ISI components that may be generated by reducing the boost amount B by the total reduction amount M, this allows the FIR circuit 16 to compensate for the ISI components which remain uncompensated by the DFE circuit 12 at the pre-cursor. Accordingly, while suppressing the increase width amount of a noise by reducing the boost amount B, the ISI components at both the post-cursor and the pre-cursor can be compensated.

The ISI component at the pre-cursor may be assumed to increase in accordance with the reduction amount of the boost amount B. Therefore, the control circuit 13 determines a magnitude of the total increase amount N of the tap coefficient $C_m$ and a magnitude of the total reduction amount M of the boost amount B so as to be correlated to each other. In this manner, the FIR circuit 16 is able to perform appropriate compensation even when significant reduction in the boost amount B causes the equalization ability of the CTLE circuit 11 to be diminished, and the ISI components at the pre-cursor are increased.

4.5 Modified Example of Fourth Embodiment

The fourth embodiment is not limited to the above-mentioned example, and can be modified in various ways. For example, in the fourth embodiment, although the linear equalizer 20 has been explained as being configured to include both the CTLE circuit 11 and the FIR circuit 16, the linear equalizer 20 is not limited to this.

FIG. 21 is a block diagram for explaining a configuration of an equalizer according to a modified example of the fourth embodiment. FIG. 21 corresponds to FIG. 17 explained in the fourth embodiment.

As shown in FIG. 21, a linear equalizer 20 may be configured to include an FIR circuit 16A, without including a CTLE circuit 11. In this case, the linear equalizer 20 is, for example, configured to be able to adjust a waveform equalization characteristic of the FIR circuit 16A based on a tap coefficient $C_p$ as well, in addition to the tap coefficients $C_0$ and $C_m$ that are transmitted from a control circuit 13.

FIG. 22 is a block diagram for explaining a configuration of the FIR circuit 16A according to the modified example of the fourth embodiment. FIG. 22 shows an example of a case in which, within the linear equalizer 20, a reception signal RCV is input to the FIR circuit 16A, and an equalization signal EQ1b is output.

As shown in FIG. 22, the FIR circuit 16A further includes a plurality of delay circuits 165 (165-1, . . . 165-2, . . . , 165-i), and a plurality of buffer circuits 166 (166-1, 166-2, . . . , 166-i) (i is an optional natural number). Each of the plurality of delay circuits 165 has the equivalent functional configuration as a plurality of delay circuits 161. Each of the plurality of buffer circuits 166 has the equivalent functional configuration as a plurality of buffer circuits 162 and 163.

The plurality of delay circuits 161 are connected to each other in series. Specifically, at a delay circuit 161-j, a reception signal RCV(-jT) is input, and a reception signal RCV((-j+1)T) is output. Similarly, at a delay circuit 161-2, a reception signal RCV(-2T) is input, and a reception signal RCV(-T) is output. At a delay circuit 161-1, the reception signal RCV(-T) is input, and a reception signal RCV(0) is output.

The plurality of delay circuits 165 are connected in series to each other, and are further connected in series with respect to the plurality of delay circuits 161. Specifically, at the delay circuit 165-1, the reception signal RCV(0) is input, and a reception signal RCV(T) is output. Similarly, at the delay circuit 165-2, the reception signal RCV(T) is input, and a reception signal RCV(2T) is output. At the delay circuit 165-i, a reception signal RCV((i-1)T) is input, and a reception signal RCV(iT) is output.

Corresponding tap coefficients $C_{-j}, \ldots, C_{-2}, C_{-1}, C_0, C_1, C_2, \ldots, C_i$ are transmitted respectively from the control circuit 13 to each of the plurality of buffer circuits 163, 162, and 166, and set. The tap coefficients $C_1, C_2, \ldots,$ and $C_i$ are also collectively referred to as tap coefficients $C_p$ for a post-cursor. The buffer circuit 162 generates a signal obtained by multiplying the reception signal RCV(0) output from the delay circuit 161-1 by the corresponding tap coefficient $C_0$, and transmits the signal to an adder 164. Furthermore, each of the plurality of buffer circuits 163-1, 163-2, ..., and 163-j generates a signal obtained by multiplying each of the reception signals RCV(-T), RCV(-2T), ..., RCV(-jT) input to each of the corresponding delay circuits 161-1, 161-2, ..., and 161-j by corresponding tap coefficients $C_{-1}, C_{-2}, \ldots,$ and $C_{-j}$ as a feedback signal, and transmits each of the feedback signals to the adder 164. Furthermore, each of the plurality of buffer circuits 166-1, 166-2, ..., and 166-i generates a signal obtained by multiplying each of the reception signals RCV(T), RCV(2T), ..., RCV(iT) output from each of the corresponding delay circuits 165-1, 165-2, ..., and 165-i by corresponding tap coefficients $C_1, C_2, \ldots, C_i$ as a feedback signal, and transmits each of the feedback signals to the adder 164. For example, in a case where the tap coefficient $C_0$ is a positive value, the tap coefficients $C_m$ and $C_p$ may be set a negative values.

The adder 164 adds the feedback signals from each of the plurality of buffer circuits 163 and 166 to the signal from the buffer circuit 162, and conclusively outputs the obtained signal as an equalization signal EQ1b.

By the above configuration, the linear equalizer 20 generates the equalization signal EQ1b via the FIR circuit 16A.

Figure 23:
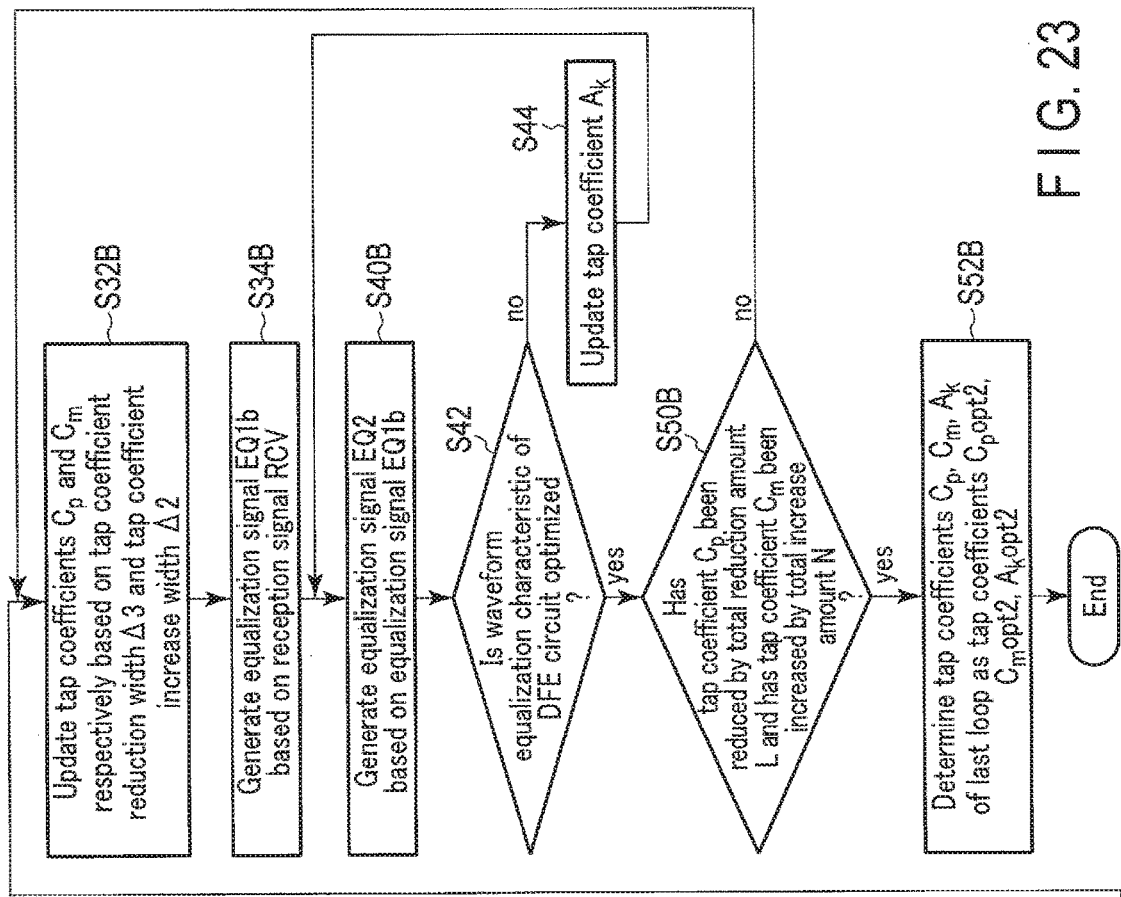
FIG. 23 is a flowchart for explaining a waveform equalization operation of the equalizer circuit according to the modified example of the fourth embodiment.
Figure 23:
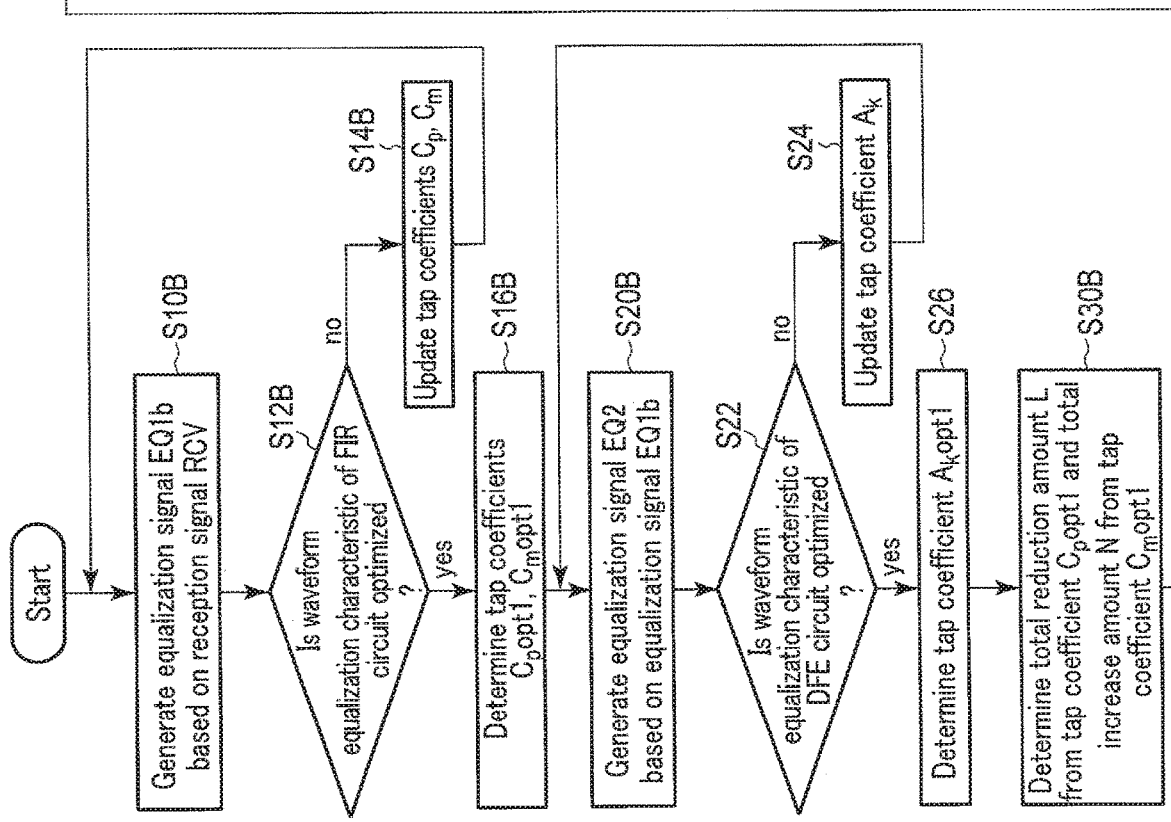

Now, an operation of the equalizer according to the modified example of the fourth embodiment will be explained using FIG. 23. FIG. 23 is a flowchart for explaining an adaptive waveform equalization operation of the equalizer according to the modified example of the fourth embodiment. FIG. 23 corresponds to FIG. 20 in the fourth embodiment, and shows a method for determining the tap coefficients $C_m$, $C_p$, and $A_k$ for obtaining a waveform equalization characteristic that is capable of optimally compensating for a transmission characteristic of a transmission path 4.

As shown in FIG. 23, in S10B, S12B, S14B, and S16B, the FIR circuit 16A and the control circuit 13 optimize the waveform equalization characteristic of the FIR circuit 16A with respect to the reception signal RCV.

Specifically, in S10B, when receiving the reception signal RCV, the FIR circuit 16A generates the equalization signal EQ1b based on the reception signal RCV. The FIR circuit 16A transmits the generated equalization signal EQ1b to a determination circuit 122 of the DFE circuit 12, and generates a determination signal S1. The generated determination signal S1 is transmitted to the control circuit 13.

In S12B, based on the determination signal S1, the control circuit 13 determines whether or not the waveform equalization characteristic of the FIR circuit 16A has been optimized. Specifically, the control circuit 13, for example, compares the determination signal S1 with a test signal, and determines that the waveform equalization characteristic has been optimized by the tap coefficients $C_m$ and $C_p$ that generate a determination signal S1 that is most suitable for the test signal.

In a case where the waveform equalization characteristic of the FIR circuit 16A is not determined as being optimized (S12B; no), the processing proceeds to S14B. After the control circuit 13 updates the tap coefficients $C_m$, and $C_p$ in S14B and sends them to the FIR circuit 16A, the processing returns to S10B.

In a case where the waveform equalization characteristic of the FIR circuit 16A is determined as being optimized (S12B; yes), loop processing is ended, and the processing proceeds to S16B. In S16B, the control circuit 13 determines the tap coefficients $C_m$ and $C_p$ in the last loop as tap coefficients $C_m$opt1 and $C_p$opt1, and proceeds to S20B.

Subsequently, in S20B, S22, S24, and S26, the DFE circuit 12 and the control circuit 13 optimize the waveform equalization characteristics of the DFE circuit 12 with respect to the equalization signal EQ1b generated by using the tap coefficients $C_m$opt1 and $C_p$opt1. Therefore, in the same manner as the fourth embodiment, the tap coefficient $A_k$ of the DFE circuit 12 is optimized to a tap coefficient $A_k$opt1.

Subsequently, in S30B, the control circuit 13 determines a total reduction amount L of the tap coefficient $C_p$ to be reduced from the tap coefficient $C_p$opt1 based on the tap coefficient $C_p$opt1, and determines a total increase amount N of the tap coefficient $C_m$ to be reduced from the tap coefficient $C_m$opt1 based on the tap coefficient $C_m$opt1. The total reduction amount L is determined in accordance with, for example, the tap coefficient $C_p$opt1. The total reduction amount L is set to, for example, a larger value as an absolute value of the tap coefficient $C_p$opt1 increases.

In S32B, S34B, S40B, S42, S44, and S50B, the FIR circuit 16A, the LIFE circuit 12, and the control circuit 13 optimize the waveform equalization characteristic of the DFE circuit 12 with respect to the equalization signal EQ1b generated by using a tap coefficient $C_p$opt2 that is smaller than the tap coefficient $C_p$opt1, and a tap coefficient $C_m$opt2 that is larger than the tap coefficient $C_m$opt1.

Specifically, in S32B, the control circuit 13 updates the tap coefficient $C_p$ to a tap coefficient $C_p$ that is reduced by a tap coefficient reduction width Δ3, and updates the tap coefficient $C_m$ a tap coefficient $C_m$ that is increased by a tap coefficient increase width Δ2 in a current loop. Any value can be set for the tap coefficient reduction width Δ3 and the tap coefficient increase width Δ2. Each of the tap coefficient reduction width Δ3 and the tap coefficient increase width Δ2 may be a value obtained by equally dividing the total reduction amount L and the total increase amount N by any number, or may be the total reduction amount L and the total increase amount N.

In S34B, based on the reception signal RCV, the linear equalizer 20 executes linear equalization processing by applying the tap coefficients $C_p$ and $C_m$ updated in S32B, and generates the equalization signal EQ1b.

Since the operations in S40B to S44 are the same as the operations in S20B to S24, the explanations thereof will be omitted, or simplified.

In the case where the waveform equalization characteristic of the DFE circuit 12 is determined as being optimized in S42 (S42; yes), the processing proceeds to S50B. In S50B, the control circuit 13 determines whether or not the tap coefficient $C_p$ has been reduced from the tap coefficient $C_p\text{opt1}$ by the total reduction amount L, and the tap coefficient $C_m$ has been increased from an initial value by the total increase amount N in the current loop.

In the case where the reduction amount of the tap coefficient $C_p$ and the increase amount of the tap coefficient $C_m$ in the current loop are determined to have not respectively reached the total reduction amount L and the total increase amount N (S50B; no), the processing returns to S32B, and the control circuit 13 recursively executes S32B to S50B. On the other hand, in a case where the reduction amount of the tap coefficient $C_p$ and the increase amount of the tap coefficient $C_m$ in the current loop are determined have respectively reached the total reduction amount L and the total increase amount N (S50B; yes), the control circuit 13 ends loop processing, and proceeds to S52B.

In S52B, the control circuit 13 determines each of the tap coefficients $C_p$, $C_m$, and $A_k$ in the last loop as tap coefficients $C_p\text{opt2}$, $C_m\text{opt2}$, and $A_k\text{opt2}$, and uses the determined values upon regular operations thereafter.

Hereby, the waveform equalization operation of the equalizer 10 is ended.

According to the modified example of the fourth embodiment, by adjusting the tap coefficients $C_m$ and $C_p$ of the FIR circuit 16A, even in a case where the equalizer 10 does not include the CTLE circuit 11, the equivalent advantageous effects as in the fourth embodiment can be exercised.

5. Fifth Embodiment

An equalizer according to a fifth embodiment will be explained. In the equalizer according to the fourth embodiment, a configuration in which the linear equalizer 20 within the reception circuit 6 includes the CTLE circuit 11 and the FIR circuit 16 was explained. However, the FIR circuit that is capable of compensating for the ISI at the pre-cursor is not limited to being provided within the reception circuit 6, and may be provided within a transmission circuit 2. In the following, the same reference symbols as used in the first embodiment to the fourth embodiment will be used for the same constituent elements, and explanations thereof will be omitted or simplified. Only parts different from the first embodiment to the fourth embodiment will be explained.

5.1 Configuration of Transmission System

FIG. 24 is a block diagram showing an example of a configuration of a transmission system 1A according to the fifth embodiment. The transmission system 1A is configured to be able to transmit/receive data reciprocally between a first transmission/reception device D1 that is connected to a first end T1 of each of transmission paths 4 and 5, and a second transmission/reception device D2 that is connected to a second end T2 of each of the transmission paths 4 and 5.

As shown in FIG. 24, the first transmission/reception device D1 is provided with a transmission circuit 2 and a reception circuit 3, and the second transmission/reception device D2 is provided with a reception circuit 6 and a transmission circuit 7. High-speed serial communications are realized respectively by the transmission circuit 2 and the reception circuit 6 via the transmission path 4, and by the transmission circuit 7 and the reception circuit 3 via the transmission path 5.

A configuration of the second transmission/reception device D2 will first be explained.

The reception circuit 6 has the equivalent configuration as that of the reception circuit 6 explained in FIG. 1 and FIG. 3 of the first embodiment. A control circuit 13 is configured to be able to generate a tap coefficient update request CNT upon an operation of optimizing a waveform equalization characteristic of a CTLE circuit 11 and a DFE circuit 12. The tap coefficient update request CNT is a control signal that includes information of updating a tap coefficient of an FIR circuit 31 provided within the transmission circuit 2 within the first transmission/reception device D1, and is, for example, transmitted from the control circuit 13 to the transmission circuit 7.

When receiving the tap coefficient update request CNT from the control circuit 13, the transmission circuit 7 transmits the tap coefficient update request CNT to the reception circuit 3 within the first transmission/reception device D1 via the transmission path 5.

A configuration of the first transmission/reception device D1 will now be explained.

When receiving the tap coefficient update request CNT from the transmission circuit 7, the reception circuit 3 transfers the tap coefficient update request CNT to a control circuit 32 within the transmission circuit 2.

The transmission circuit 2 has a functional configuration for transmitting a transmission signal TR toward the reception circuit 6, and is provided with an equalizer 30 that is capable of compensating for a waveform of the transmission signal TR. The equalizer includes, for example, the FIR circuit 31 and the control circuit 32.

The control circuit 32 controls the equalizer 30. Specifically, the control circuit 32 determines a tap coefficient $C_m$ to be applied to the FIR circuit 31 and transmits it to the FIR circuit 31. The control circuit 32 may update the tap coefficient $C_m$ based on, for example, the tap coefficient update request CNT received from outside the transmission circuit 2 (for example, the reception circuit 3).

The FIR circuit 31, for example, has the equivalent configuration as that of the FIR circuit 16 explained in FIG. 18 of the fourth embodiment. The FIR circuit 31 applies linear equalization processing to the transmission signal TR based on the tap coefficient $C_m$ determined in the control circuit 32.

By the above configuration, the equalizer 30 is able to execute the equalization processing on the transmission signal TR based on the tap coefficient $C_m$ updated based on the tap coefficient update request CNT. The equalizer 10 can also execute a further equalization processing based on the transmission signal TR to which the equalization processing has been applied.

Figure 25:
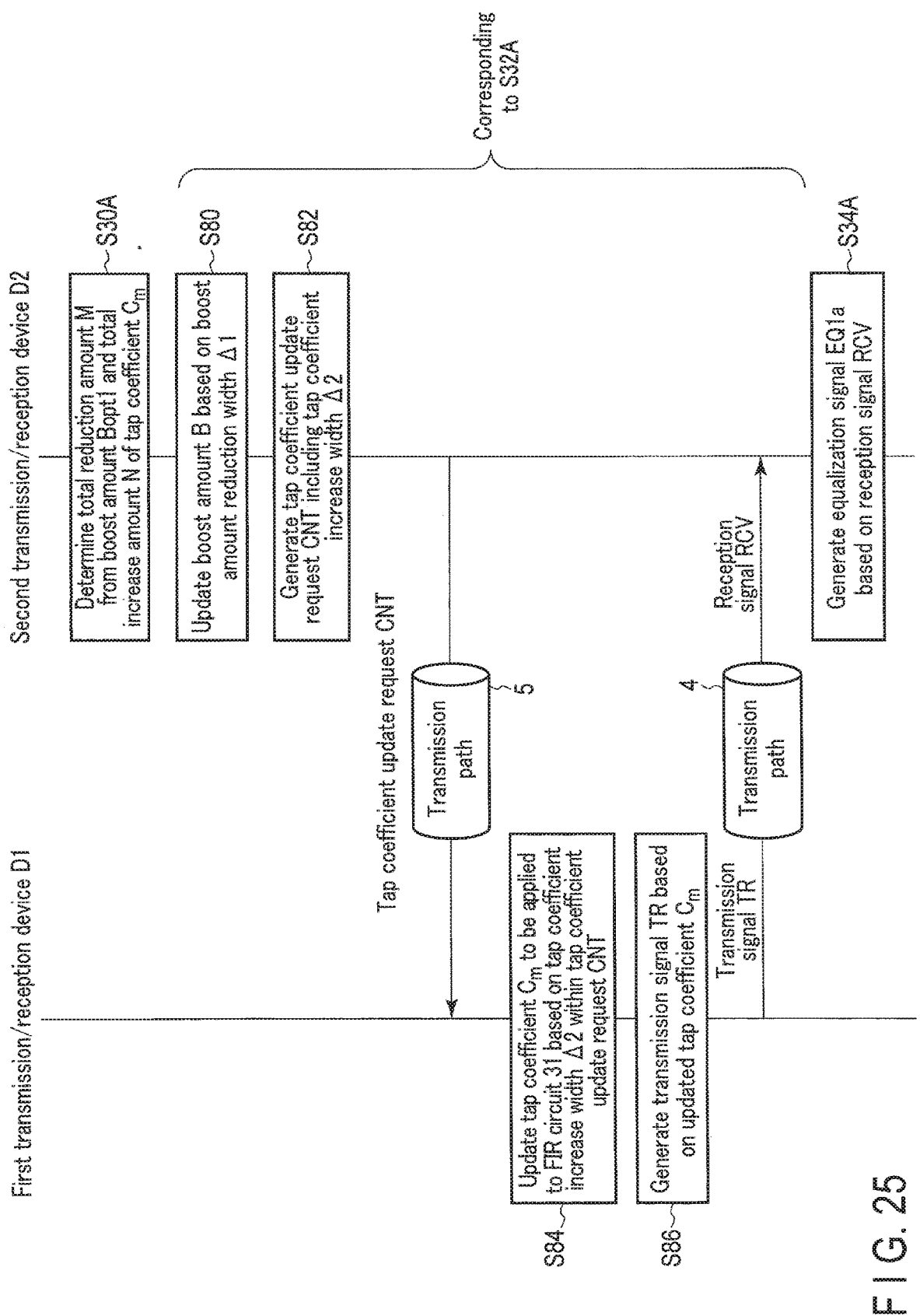
FIG. 25 is a timing chart for explaining a waveform equalization operation including a tap coefficient update operation in a transmission circuit according to the fifth embodiment.

5.2 Equalization Operation Including Tap Coefficient Update Operation in Transmission Circuit FIG. 25 is a timing chart for explaining a waveform equalization operation including a tap coefficient update operation in a transmission circuit according to the fifth embodiment. In FIG. 25, portions corresponding to S30A to S34A in FIG. 20 of the fourth embodiment are shown. More specifically, S80, S82, S84, and S86 are shown in FIG. 25 as portions corresponding to S32A. In the example of FIG. 25, it is assumed that the FIR circuit 31 capable of compensating for the ISI at a pre-cursor is provided in the equalizer 30 within the transmission circuit 2 in the first transmission/reception device D1. In the second transmission/reception device D2, the reception circuit 6 is assumed as recognizing that the FIR circuit 31 is provided within the first transmission/reception device D1. In the following explanation, in order to distinguish constituent elements within the first transmission/reception device D1 and constituent elements within the second transmission/reception device D2, (D1) or (D2) may be added after the symbols. For example, the control circuit 13 within the second transmission/reception device D2 may be described as control circuit 13 (D2), and the control circuit 32 within the first transmission/reception device D1 may be described as control circuit 32 (D1).

As shown in FIG. 25, in S30A, based on a boost amount Bopt1, the control circuit 13 (D2) determines a total reduction amount M of a boost amount to be reduced from the boost amount Bopt1, and determines a total increase amount N of a tap coefficient $C_m$ to be applied to the FIR circuit 31 (D1).

In S80, the control circuit 13 (D2) updates the boost amount B in a current loop to a boost amount B from which a boost amount reduction width Δ1 has been deducted. The control circuit 13 (D2) determines a tap coefficient increase width Δ2 based on the boost amount Bopt1 in the current loop.

In S82, the control circuit 13 (D2) generates a tap coefficient update request CNT including information of increasing the tap coefficient $C_m$ to be applied to the FIR circuit 31 (D1) by the tap coefficient increase width Δ2, and transmits it to the transmission circuit 7 (D2). When receiving the tap coefficient update request CNT, the transmission circuit 7 (D2) transmits the tap coefficient update request CNT to the reception circuit 3 (D1) via the transmission path 5.

The reception circuit 3 (D1) transfers the tap coefficient update request CNT to the control circuit 32 (D1). In S84, the control circuit 32 (D1) updates the tap coefficient $C_m$ to be applied to the FIR circuit 31 (D1) based on the tap coefficient increase width Δ2 included in the tap coefficient update request CNT.

In S86, the FIR circuit 31 (D1) executes linear equalization processing with respect to the transmission signal TR based on the updated tap coefficient $C_m$. The transmission circuit 2 (D1) transmits the transmission signal TR with respect to which the linear equalization processing has been executed to the reception circuit 6 (D2). After being converted into a reception signal RCV while receiving attenuation by the transmission path 4, the reception signal RCV is received by the reception circuit 6 (D2).

In S34A, the CTLE circuit 11 (D2) executes the linear equalization processing by applying the updated boost amount B, and generates an equalization signal EQ1a based on the reception signal RCV with respect which the linear equalization processing has been executed by applying the updated tap coefficient $C_m$.

By the above operation, the tap coefficient $C_m$ to be applied to the FIR circuit 31 (D1) can be updated to a desired value.

5.3 Advantageous Effects Present Embodiment

According to the fifth embodiment, the control circuit 13 within the reception circuit 6 transmits the tap coefficient update request CNT to the FIR circuit 31 within the transmission circuit 2 via the transmission path 5. In this manner, even in a case where the FIR circuit is not included in the reception circuit 6, the overall transmission system 1A is capable of compensating for the ISI corresponding to a pre-cursor.

6. Others

The embodiments of the present invention explained above are not limited thereto, and various modifications may be adopted for each of the embodiments. For example, in the fourth embodiment, the modified example of the fourth embodiment, and the fifth embodiment, a case in which the tap coefficient $C_m$ is updated by the same method as in the first embodiment was explained; however, the method is not limited thereto. Specifically, each of the configurations and the operations of the modified example of the first embodiment, the second embodiment, the modified example of the second embodiment, the third embodiment, and the modified example of the third embodiment may be similarly adopted in the fourth embodiment, the modified example of the fourth embodiment, and the fifth embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit the inventions.

What is claimed is:

1. An equalizer circuit, comprising:
a linear equalizer configured to linearly amplify a certain band within a reception signal;
a non-linear equalizer configured to determine a value of an output signal of the linear equalizer based on a clock signal, and to feed back a determination result of the value to the output signal; and
a control circuit, wherein
the control circuit is configured to
set a first control amount, the first control amount optimizing an equalization characteristic of the linear equalizer with respect to the reception signal,
determine a second control amount that optimizes an equalization characteristic of the non-linear equalizer with respect to a first signal generated by the linear equalizer to which the first control amount is set,
set the second control amount to the non-linear equalizer,
change a control amount to be set to the linear equalizer from the first control amount to a third control amount that is smaller by a particular amount than the first control amount, the particular amount having a value based on the first control amount,
set the updated third control amount to the linear equalizer,
determine a fourth control amount that optimizes the equalization characteristic of the non-linear equalizer with respect to a second signal generated by the linear equalizer to which the third control amount is set, and
update a control amount to be set to the non-linear equalizer from the second control amount to the fourth control amount, wherein
the first control amount, the second control amount, the third control amount, and the fourth control amount are determined so that an aperture of an eye pattern of the first signal, an aperture of an eye pattern of a third signal that is generated based on the third control amount and the fourth control amount, and an aperture of an eye pattern of a fourth signal that is generated based on the first control amount and the second control amount satisfy a particular condition, and an aperture of an eye pattern of the second signal does not satisfy the particular condition.

2. The circuit of claim 1, further comprising a clock generation circuit that generates the clock signal that is synchronized with the output signal based on the determination result.

3. The circuit of claim 1, further comprising an eye monitor circuit that monitors the eye pattern, wherein
the control circuit is configured to
determine whether or not the aperture of the eye pattern of the third signal that is generated based on the third control amount and the fourth control amount satisfies the particular condition,
in a case of determining that the particular condition is satisfied, recursively execute processing for updating the first control amount to the third control amount, and processing for updating the second control amount to the fourth control amount so that the third control amount decreases in stages, and
in a case of determining that the particular condition is not satisfied, respectively set to the linear equalizer and the non-linear equalizer the third control amount and the fourth control amount that correspond to an eye pattern lastly determined to have satisfied the particular condition.

4. The circuit of claim 1, further comprising an eye monitor circuit that monitors the eye pattern, wherein
the control circuit is configured to
determine whether or not the third control amount is lower than a certain threshold,
in a case where the third control amount is determined as not being lower than the certain threshold, recursively execute processing for updating the first control amount to the third control amount, processing for updating the second control amount to the fourth control amount, and processing for evaluating the aperture of the eye pattern of the third signal that is generated based on the third control amount and the fourth control amount so that the third control amount decreases in stages, and
in a case where the third control amount is determined as being lower than the certain threshold, respectively set to the linear equalizer and the non-linear equalizer the third control amount and the fourth control amount that correspond to an eye pattern with the largest aperture.

5. The circuit of claim 1, wherein
the linear equalizer comprises a first circuit that successively operates with respect to a time domain, and
the control circuit is configured to
set the first control amount to the first circuit, and
update the first control amount set to the first circuit to the third control amount by reducing the first control amount based on a magnitude of the first control amount.

6. The circuit of claim 5, wherein
the linear equalizer further comprises a second circuit that discretely operates with respect to the time domain, and
the control circuit is configured to
set a fifth control amount to the second circuit, and
update the fifth control amount set to the second circuit to a sixth control amount by increasing a pre-cursor component of the fifth control amount while reducing the first control amount based on a magnitude of the first control amount.

7. The circuit of claim 1, wherein
the linear equalizer comprises a third circuit that discretely operates with respect to a time domain, and
the control circuit is configured to
set the first control amount to the third circuit, and
update the first control amount set to the third circuit to the third control amount by increasing a pre-cursor component of the first control amount while reducing a post-cursor component of the first control amount based on a magnitude of the first control amount.

8. A control method of an equalizer circuit comprising a linear equalizer configured to linearly amplify a certain band within a reception signal, and a non-linear equalizer configured to determine a value of an output signal of the linear equalizer based on a clock signal, and to feed back a determination result of the value to the output signal, the control method comprising:
setting a first control amount to the linear equalizer, the first control amount optimizing an equalization characteristic of the linear equalizer with respect to the reception signal;
generating a first signal by the linear equalizer to which the first control amount is set;
determining a second control amount for optimizing an equalization characteristic of the non-linear equalizer with respect to the first signal;
setting the second control amount to the non-linear equalizer;
changing a control amount to be set to the linear equalizer from the first control amount to a third control amount that is smaller by a particular amount than the first control amount, the particular amount having a value based on the first control amount;
setting the updated third control amount to the linear equalizer;
generating a second signal by the linear equalizer to which the third control amount is set;
determining a fourth control amount for optimizing the equalization characteristic of the non-linear equalizer with respect to the second signal; and
updating a control amount to be set to the non-linear equalizer from the second control amount to the fourth control amount, wherein
the first control amount, the second control amount, the third control amount, and the fourth control amount are determined so that an aperture of an eye pattern of the first signal, an aperture of an eye pattern of a third signal that is generated based on the third control amount and the fourth control amount, and an aperture of an eye pattern of a fourth signal that is generated based on the first control amount and the second control amount satisfy a particular condition, and an aperture of an eye pattern of the second signal does not satisfy the particular condition.

9. The method of claim 8, further comprising generating the clock signal that is synchronized with the output signal based on the determination result.

10. The method of claim 8, further comprising:
determining whether or not the aperture of the eye pattern of the third signal that is generated based on the third control amount and the fourth control amount satisfies the particular condition;
in a case of determining that the particular condition is satisfied, recursively executing processing for updating the first control amount to the third control amount, and processing for updating the second control amount to the fourth control amount so that the third control amount decreases in stages; and in a case of determining that the particular condition is not satisfied, respectively setting to the linear equalizer and the non-linear equalizer the third control amount and the fourth control amount that correspond to an eye pattern lastly determined to have satisfied the particular condition.

11. The method of claim 8, further comprising:

determining whether or not the third control amount is lower than the certain threshold;

in a case where the third control amount is determined as not being lower than the certain threshold, recursively executing processing for updating the first control amount to the third control amount, processing for updating the second control amount to the fourth control amount, and processing for evaluating the aperture of an eye pattern of the third signal that is generated based on the third control amount and the fourth control amount so that the third control amount decreases in stages, and in a case where the third control amount is determined as being lower than the certain threshold, respectively setting to the linear equalizer and the non-linear equalizer the third control amount and the fourth control amount that correspond to an eye pattern with the largest aperture.

12. The method of claim 8, wherein the linear equalizer comprises a first circuit that successively operates with respect to a time domain, setting the first control amount includes setting the first control amount to the first circuit, and updating the third control amount includes updating the first control amount set to the first circuit to the third control amount by reducing the first control amount based on a magnitude of the first control amount.

13. The method of claim 12, wherein the linear equalizer further comprises a second circuit that discretely operates with respect to the time domain, and further comprising:

setting a fifth control amount to the second circuit; and updating a fifth control amount set to the second circuit to a sixth control amount by increasing a pre-cursor component of the fifth control amount while reducing the first control amounts based on a magnitude of the first control amount.

14. The method of claim 8, wherein the linear equalizer comprises a third circuit that discretely operates with respect to a time domain, setting the first control amount includes setting the first control amount to the third circuit, and updating the third control amount includes updating the first control amount set to the third circuit to the third control amount by increasing a pre-cursor component of the first control amount while reducing a post-cursor component of the first control amount based on a magnitude of the first control amount.

15. The method of claim 8, wherein the equalizer circuit is communicably connected via a transmission path to a fourth circuit that discretely operates with respect to a time domain, and linearly amplifies a certain band within the reception signal, and the method further comprises:

determining a seventh control amount of the fourth circuit based on a magnitude of the first control amount;

generating information related to setting the seventh control amount;

transmitting the information to the fourth circuit via the transmission path, and setting the seventh control amount to the fourth circuit; and receiving via the transmission path a signal as a second reception signal, the signal indicating a computing result of the fourth circuit to which the seventh control amount is set, the second signal being generated by the linear equalizer to which the second reception signal is input, and to which the third control amount is set.

16. The method of claim 15, wherein determining the seventh control amount includes determining an increase amount of a pre-cursor component of the seventh control amount.

* * * * *